United States Patent
Sowinski et al.

(10) Patent No.: US 8,991,986 B2
(45) Date of Patent: Mar. 31, 2015

(54) CONTINUOUS INKJET PRINTING METHOD

(75) Inventors: Allan Francis Sowinski, Rochester, NY (US); Simon C. Haseler, Rochester, NY (US); Robert Link, Webster, NY (US); Rajesh Vinodrai Mehta, Rochester, NY (US); Todd Russell Griffin, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 78 days.

(21) Appl. No.: 13/449,745

(22) Filed: Apr. 18, 2012

(65) Prior Publication Data

US 2013/0278689 A1   Oct. 24, 2013

(51) Int. Cl.

| | |
|---|---|
| *B41J 2/07* | (2006.01) |
| *B41J 2/175* | (2006.01) |
| *B41J 2/105* | (2006.01) |
| *C09D 11/10* | (2014.01) |
| *C09D 11/322* | (2014.01) |
| *C09D 11/324* | (2014.01) |
| *B41J 2/02* | (2006.01) |
| *B41J 2/09* | (2006.01) |
| *B41J 2/03* | (2006.01) |

(52) U.S. Cl.
CPC .................. *C09D 11/10* (2013.01); *B41J 2/105* (2013.01); *B41J 2002/031* (2013.01); *C09D 11/322* (2013.01); *C09D 11/324* (2013.01)
USPC ..................... 347/73; 347/74; 347/77; 347/93

(58) Field of Classification Search
CPC .............. B41J 2/03; B41J 2/025; B41J 2/085; B41J 2/09; B41J 2/12
USPC ...................... 347/7, 85, 95, 100, 106, 73, 90
See application file for complete search history.

(56) References Cited

U.S. PATENT DOCUMENTS

| | | | |
|---|---|---|---|
| 4,460,904 A | 7/1984 | Oszczakiewicz et al. | |
| 4,614,948 A | 9/1986 | Katerberg et al. | |
| 4,658,268 A | 4/1987 | Needham | |
| 5,870,124 A * | 2/1999 | Silverbrook | 347/85 |
| 5,933,171 A * | 8/1999 | Komatsu | 347/75 |
| 6,554,410 B2 | 4/2003 | Jeanmaire et al. | |
| 6,588,888 B2 | 7/2003 | Jeanmaire et al. | |
| 6,592,213 B2 * | 7/2003 | Long | 347/90 |

(Continued)

FOREIGN PATENT DOCUMENTS

JP          03-023129          2/1991

*Primary Examiner* — Matthew Luu
*Assistant Examiner* — Patrick King
(74) *Attorney, Agent, or Firm* — Andrew J. Anderson; William R. Zimmerli

(57) ABSTRACT

A method of printing an image with a continuous inkjet printer system employing bimodal drop size generation with pigmented inkjet ink compositions comprising a polymer additive, wherein the liquid ink is an aqueous inkjet ink comprises dispersed pigment colorant particles having a mean particle size of less than 150 nanometers and at least about 0.1 wt % of polymer additive distinct from any polymer dispersant used to disperse the pigment particles, and recirculating liquid ink supplied to the nozzle if the printer system from a liquid ink source is in-line filtered with a filter selected to be effective at retaining particles having particle sizes equal to and greater than 0.6 micrometers from the liquid ink and to pass the dispersed pigment particles. The invention enables high quality drop control in a continuous inkjet printing system.

20 Claims, 4 Drawing Sheets

(56) References Cited

U.S. PATENT DOCUMENTS

| | | |
|---|---|---|
| 6,817,705 B1 | 11/2004 | Crockett et al. |
| 6,863,385 B2 | 3/2005 | Jeanmarie et al. |
| 6,866,370 B2 | 3/2005 | Jeanmaire |
| 7,163,283 B2 | 1/2007 | Loyd et al. |
| 7,293,867 B2* | 11/2007 | Ogawa et al. ............. 347/100 |
| 7,393,094 B2* | 7/2008 | Taguchi et al. ............. 347/100 |
| 7,402,201 B2* | 7/2008 | Wachi et al. ............. 106/31.52 |
| 7,571,969 B2* | 8/2009 | Kusunoki et al. ............. 347/9 |
| 7,682,002 B2 | 3/2010 | Brost et al. |
| 7,767,735 B2* | 8/2010 | Koganehira ............. 523/160 |
| 7,946,691 B2 | 5/2011 | Griffin et al. |
| 2005/0062801 A1* | 3/2005 | Kato et al. ............. 347/45 |
| 2006/0197787 A1* | 9/2006 | Kusunoki et al. ............. 347/6 |
| 2007/0120920 A1* | 5/2007 | Taguchi et al. ............. 347/100 |
| 2008/0278552 A1* | 11/2008 | Sanada et al. ............. 347/85 |
| 2010/0265292 A1* | 10/2010 | Ohshima et al. ............. 347/16 |
| 2010/0321449 A1 | 12/2010 | Clarke et al. |
| 2011/0205319 A1 | 8/2011 | Vaeth et al. |
| 2011/0258851 A1* | 10/2011 | Xie et al. ............. 29/890.1 |
| 2011/0261123 A1* | 10/2011 | Mehta et al. ............. 347/93 |
| 2011/0261124 A1* | 10/2011 | Baumer et al. ............. 347/93 |
| 2011/0261125 A1* | 10/2011 | Xie et al. ............. 347/93 |
| 2011/0261126 A1* | 10/2011 | Faisst et al. ............. 347/93 |

* cited by examiner

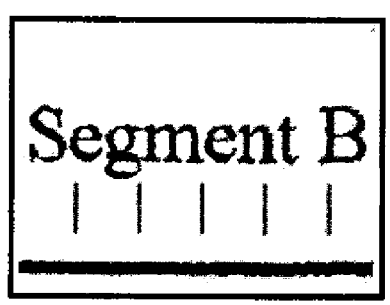 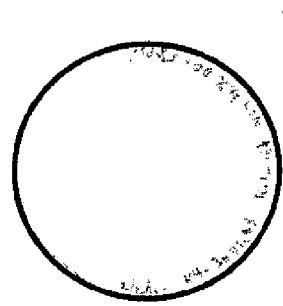
FIG. 4a  FIG. 4b
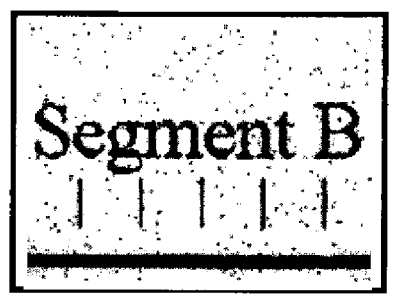 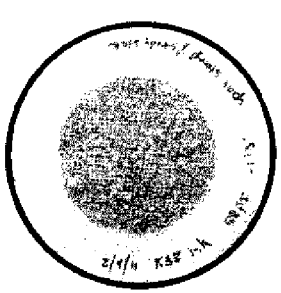
FIG. 5a  FIG. 5b
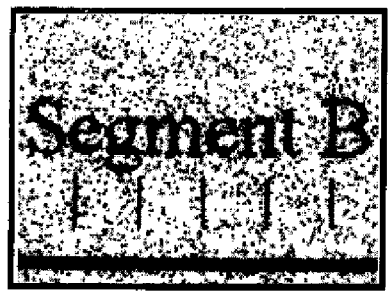 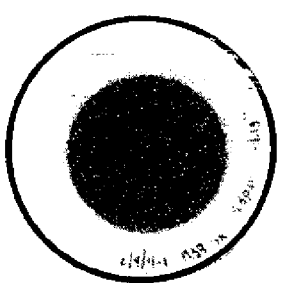
FIG. 6a  FIG. 6b
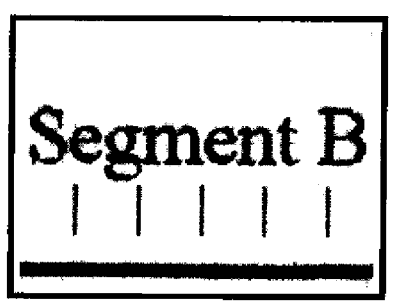 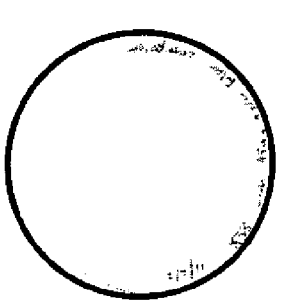
FIG. 7a  FIG. 7b

CONTINUOUS INKJET PRINTING METHOD

FIELD OF THE INVENTION

The invention relates generally to the field of inkjet printing methods, and in particular to continuous inkjet printing of aqueous pigmented ink compositions. More specifically, the invention relates to finer filtration of inkjet ink compositions containing a polymer additive during fluid recirculation to provide high speed continuous inkjet printing with reduced drop control defects that lead to print artifacts.

BACKGROUND OF THE INVENTION

In one form of binary continuous inkjet (CIJ) printing, such as described in U.S. Pat. Nos. 6,554,410; 6,588,888; 6,863,385; and 6,866,370, a printhead produces fluid drops by thermal stimulation of the fluid jet of inkjet ink using ring heaters surrounding the nozzle orifice that initiate pinch-off of the fluid ligament and its induced reorganization into a spherical drop during flight. Unlike electrostatic deflection CIJ, the drops are not monodisperse, and two populations of relatively large drops and relatively smaller drops are intentionally produced. Typically, the large drops are employed as printing drops and the small drops are non-printing drops. Additional droplet types undesirably can form, including satellites and coalesced small non-printing drops. In one useful implementation, the volume of a large printing drop is threefold or fourfold that of a normal small non-printing drop; undesired merged non-printing drops (or catch drops) are 2× in volume. Printing and non-printing drops of ink are selected for marking the substrate and return to the ink tank, respectively, by means air deflection steering of the drop stream towards a catcher surface or gutter. Lateral direction of an air stream at the fluid droplet stream in flight imparts orthogonal momentum to the drops that succeeds in driving the non-printing drops to impact the gutter during a critical segment of the flight, but does not drive the printing drops quite so far, and their flight continues until they impact the substrate being printed. Understandably, the air flow must be carefully adjusted to accurately select between the drop populations, and apparatus for providing controlled gas flow is described in the above referenced patents and further, e.g., in U.S. Pat. Nos. 7,682,002 and 7,946,691. If the air flow is insufficient, such that small non-printing drops are not deflected far enough, they can reach the substrate being printed and a marking error of unintended printing occurs that is referred to as "dark defect" (DD), reducing print quality. If the air flow is too aggressive, large printing drops may also be swept into the gutter and not mark the substrate at all, creating another marking error due to the incomplete print image that is referred to as "pick out" (PO). The difference in the air flow settings (e.g., volumetric flow rate, or differential pressure) between the onsets of the two printing defects is referred to as "operating window," "printing window," "operating margin" or "printing margin", or simply "print margin" or "print window." It is typically desirable to enlarge the print window in order to maximize the robustness of the printing process. Operating settings of air flow through positive and negative ducts of the air deflection manifold are typically chosen by printing a test image, and then varying the air flow for each individual jetting module of a line head until it resides within the operating window between the onsets of the two defects. When the operating margin is properly established, dark defect should be practically eliminated.

Pigmented continuous inkjet inks are comprised of particles and the particle size distribution can profoundly affect the quality of drop formation. Increasing the average particle size of particulates dispersed in the ink increases the undesired merging of small, non-printing drops (or catch drops) that are 2× in volume, as described in U.S. Patent Application No. 2010/0321449 A1 to Clarke et al, which also leads to dark defect. The fresh ink original particle size distribution is accordingly chosen to provide good drop formation properties.

U.S. Pat. No. 7,163,283 B2 to Loyd et al. discloses that a fluid filter can be placed between the ink supply pump and the printhead of a continuous inkjet printer fluid system. Such in-line fluid filtration is typically designed to remove oversize particles not within the original particle size distribution of the fresh inks as supplied to the system (such as particles which may arise from adventitious contamination of the ink by ambient particles of dirt or debris, skin flakes, manufacturing residues, wear of the hardware components, and so forth, which contamination particles are typically of a size greater than 1 micrometer) so as to protect against nozzle plugging which may be caused by such oversize particles. The effective pore size of such in-line filter has accordingly been selected based on a fraction of the nozzle diameter, as filtration of particles above $\frac{1}{10}$ of the effective diameter of the nozzle (or even above $\frac{1}{3}$ or $\frac{1}{2}$, as disclosed in U.S. Pat. Pub. No. 2011/0205319) is expected to be effective at preventing nozzle plugging, while minimizing pressure drop to achieve such desired particle filtration. As recent continuous inkjet printers have employed a nozzle size of approximately 9-10 micrometers, in-line filters have typically been selected to provide effective particle size filtration of approximately 1 micrometer. U.S. Pat. No. 7,163,283, e.g., discloses that the typical filter medium could be polymer-based (e.g., polypropylene) with a particle removal rating of 0.8 to 1.2 micrometers.

U.S. Pat. No. 4,460,904 to Oszakiewicz et al. and U.S. Pat. No. 4,658,268 to Needham, and published Japanese Application No. 03-023129 to Takatoshi are directed at electrostatic deflection continuous inkjet printing systems and have filtered fluid recirculation systems that are different from the ink supply loop to the printhead. In U.S. Pat. No. 4,460,904, the ink fluid recirculation system has a low-volume, high-pressure, filtered fluid path to the printhead, and the ink tanks is connected to a high-volume, low-pressure fluid path which also contains a filter; effective particle removal efficiencies are not disclosed. In U.S. Pat. No. 4,658,268, the primary ink tank filter of 3 micron pore size supplies ink through a 5-micron filter-damper to the printhead, and the return stream passes through a 20-micron gutter filter. In JP 03-023129, two fluid circulation pathways draw ink from the primary ink tank, one to supply the printhead and the other continuously stir the ink and redisperse settled pigment. Effective particle removal efficiencies are not disclosed, and pigment particles that settle are not of the colloidal domain and thus probably exceed 0.5 micrometers in effective particle diameter.

SUMMARY OF THE INVENTION

It has been found that effective particle size growth within a recirculating ink supply of a continuous inkjet printing system employing a pigmented ink with polymer additive can occur due to ink colloidal instability, or ink drying and incomplete re-dissolution and re-dispersion. In addition to chronically elevated levels of dark defect within a sound operating window, acute bursts of 2× non-printing drops in bimodal drop printing modes are observed to occur after certain printer operational procedures. The resultant unintentional white space marking is referred to herein as "pepper spray", since it resembles ground black pepper shaken on a white napkin.

Such problem may be solved in accordance with one embodiment of the present invention, whereby a method of printing an image with a continuous inkjet printer system is provided comprising providing a jetting module including a nozzle in fluid communication with a liquid ink source; causing liquid ink to be jetted through the nozzle; causing liquid ink drops of at least two different sizes to be formed from the ink that is jetted through the nozzle; providing a catcher including a liquid drop contact face, using a deflection mechanism to deflect liquid ink drops of one size onto the liquid drop contact face of the catcher; and allowing liquid ink drops of another size to pass by the catcher and deposit onto a print media; and causing liquid drops that contact the liquid drop contact face to be recirculated to the liquid ink source; wherein the liquid ink is an aqueous inkjet ink comprising dispersed pigment colorant particles having a mean particle size of less than 150 nanometers and at least about 0.1 wt % of polymer additive distinct from any polymer dispersant used to disperse the pigment particles, and the liquid ink supplied to the nozzle from the liquid ink source is in-line filtered with a filter selected to be effective at retaining particles having particle sizes equal to and greater than 0.6 micrometers (preferably selected to be effective at retaining particles having particle sizes equal to and greater than 0.5 micrometers, and more preferably selected to be effective at retaining particles having particle sizes equal to and greater than 0.45 micrometers) from the liquid ink and to pass the dispersed pigment particles.

Advantageous Effect of the Invention

The invention provides numerous advantages. It has been found that pigmented inkjet ink compositions comprised of a polymer additive in addition to any polymer dispersant used to disperse the pigment particles, such as structural binder polymers for improved print durability, are subject to degradation during recirculation of the ink in a continuous inkjet printing system employing bimodal drop size generation, impairing drop formation and drop control, and that most surprisingly high quality drop control can be restored by employing an in-line system filter having a smaller particle size removal rating than previously employed in such systems to prevent nozzle plugging. Demanding images can again be printed that are simultaneously substantially free of both DD and PO defects. By careful selection of filter particle removal rating, high filter lifetime and fluid permeability can be achieved while providing adequate control of oversize ink particles formed by a gas deflection continuous inkjet printing system.

BRIEF DESCRIPTION OF THE DRAWINGS

In the detailed description of the example embodiments of the invention presented below, reference is made to the accompanying drawings, in which:

FIG. 4a is a magnified section of a printed diagnostic target image using ink K-A that reveals low levels of undesired non-printing drop spots when an optimum print window is properly established while using an ink system filter with an effective particle removal rating of 0.8 micrometers. FIG. 4b is an image of an air filter membrane removed from the catcher duct assembly that serves to trap escaped black ink satellites that failed to coalesce into a print drop or non-printing drop before entering the deflection zone after hours of jetting ink K-A.

FIG. 5a is a magnified section of a printed diagnostic target image using ink K-B that reveals high levels of undesired non-printing drop spots when an optimum print window is properly established while using an ink system filter with an effective particle removal rating of 0.8 micrometers. FIG. 5b is an image of an air filter membrane removed from the catcher duct assembly that serves to trap escaped black ink satellites that failed to coalesce into a print drop or non-printing drop before entering the deflection zone after hours of jetting ink K-B.

FIG. 6a is a magnified section of a printed diagnostic target image using ink K-B that reveals very high levels of undesired non-printing drop spots following return to normal operating mode after a print head cross flushing service cycle B while using an ink system filter with an effective particle removal rating of 0.8 micrometers. FIG. 6b is an image of an air filter membrane removed from the catcher duct assembly after jetting ink K-B following a cross flush service cycle.

FIG. 7a is a magnified section of a printed diagnostic target image using ink K-B that reveals low levels of undesired non-printing drop spots after installing an ink system filter with an effective particle removal rating of 0.45 micrometers. FIG. 7b is an image of an air filter membrane removed from the catcher duct assembly that serves to trap escaped black ink satellites that failed to coalesce into a print drop or non-printing drop before entering the deflection zone after hours of jetting ink K-B using an ink system filter with an effective particle removal rating of 0.45 micrometers.

DETAILED DESCRIPTION OF THE INVENTION

Figure 1:
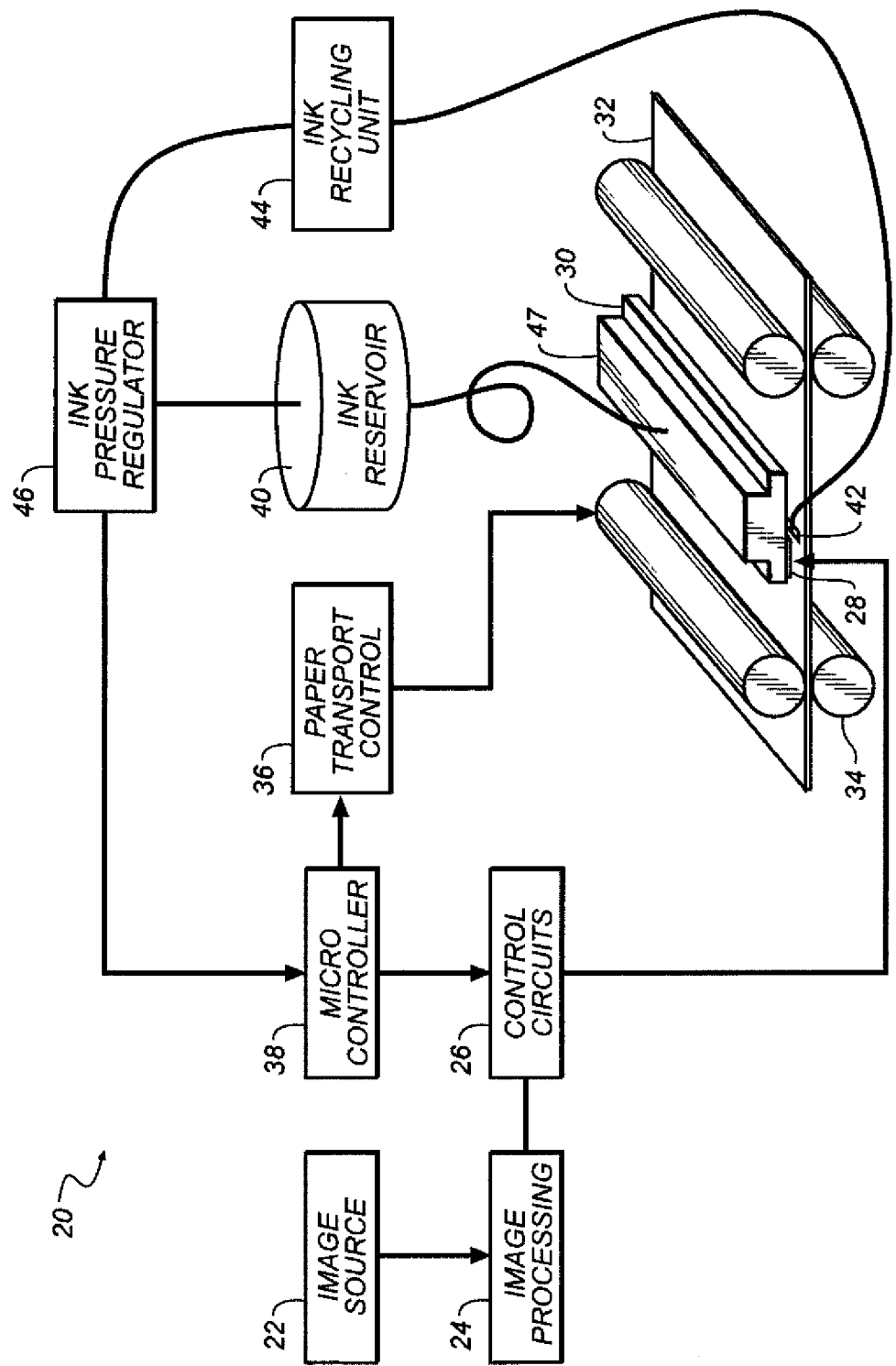
FIG. 1 shows a simplified schematic block diagram of an example embodiment of a printing system made in accordance with the present invention.

The present description will be directed in particular to elements forming part of, or cooperating more directly with, continuous inkjet printing (CIJ) system apparatus which may be employed in accordance with various embodiments of the present invention. It is to be understood that elements not specifically shown or described may take various forms well known to those skilled in the art. In the following description and drawings, identical reference numerals have been used, where possible, to designate identical elements.

The example embodiments of the CIJ printing system employed in present invention are illustrated schematically and not to scale for the sake of clarity. One of the ordinary skills in the art will be able to readily determine the specific size and interconnections of the elements of the example embodiments.

As described herein, the example embodiments provide a printhead or printhead components typically used in continuous inkjet printing systems. However, many other applications are emerging which use inkjet printheads to emit liquids (other than inks) that need to be finely metered and deposited with high spatial precision. As such, as described herein, the terms "liquid," "fluid" and "ink" refer to any material that can be ejected by the printhead or printhead components described below.

Referring to FIG. 1, a continuous printing system 20 includes an image source 22 such as a scanner or computer which provides raster image data, outline image data in the form of a page description language, or other forms of digital image data. This image data is converted to half-toned bitmap image data by an image processing unit 24 which also stores the image data in memory. A plurality of drop forming mechanism control circuits 26 read data from the image memory and apply time-varying electrical pulses to a drop forming mechanism(s) 28 that are associated with one or more nozzles of a printhead 30. These pulses are applied at an appropriate time, and to the appropriate nozzle, so that drops formed from a continuous ink jet stream will form spots on a recording medium 32 in the appropriate position designated by the data in the image memory.

Recording medium 32 is moved relative to printhead 30 by a recording medium transport system 34, which is electronically controlled by a recording medium transport control system 36, and which in turn is controlled by a micro-controller 38. The recording medium transport system shown in FIG. 1 is a schematic only, and many different mechanical configurations are possible. For example, a transfer roller could be used as recording medium transport system 34 to facilitate transfer of the ink drops to recording medium 32. Such transfer roller technology is well known in the art. In the case of page width printheads, it is most convenient to move recording medium 32 past a stationary printhead. However, in the case of scanning print systems, it is usually most convenient to move the printhead along one axis (the sub-scanning direction) and the recording medium along an orthogonal axis (the main scanning direction) in a relative raster motion.

Ink is contained in an ink reservoir 40 under pressure. In the non-printing state, continuous ink jet drop streams are unable to reach recording medium 32 due to an ink catcher 42 that blocks the stream and which may allow a portion of the ink to be recycled by an ink recycling unit 44. The ink recycling unit reconditions the ink and feeds it back to reservoir 40. Such ink recycling units are well known in the art. The ink pressure suitable for optimal operation will depend on a number of factors, including geometry and thermal properties of the nozzles and thermal properties of the ink. A constant ink pressure can be achieved by applying pressure to ink reservoir 40 under the control of ink pressure regulator 46. Alternatively, the ink reservoir can be left unpressurized, or even under a reduced pressure (vacuum), and a pump is employed to deliver ink from the ink reservoir under pressure to the printhead 30. In such an embodiment, the ink pressure regulator 46 can comprise an ink pump control system. As shown in FIG. 1, catcher 42 is a type of catcher commonly referred to as a "knife edge" catcher.

The ink is distributed to printhead 30 through an ink channel 47. The ink preferably flows through slots or holes etched through a silicon substrate of printhead 30 to its front surface, where a plurality of nozzles and drop forming mechanisms, for example, heaters, are situated. When printhead 30 is fabricated from silicon, drop forming mechanism control circuits 26 can be integrated with the printhead. Printhead 30 also includes a deflection mechanism (not shown in FIG. 1) which is described in more detail below with reference to FIGS. 2 and 3.

Figure 2:
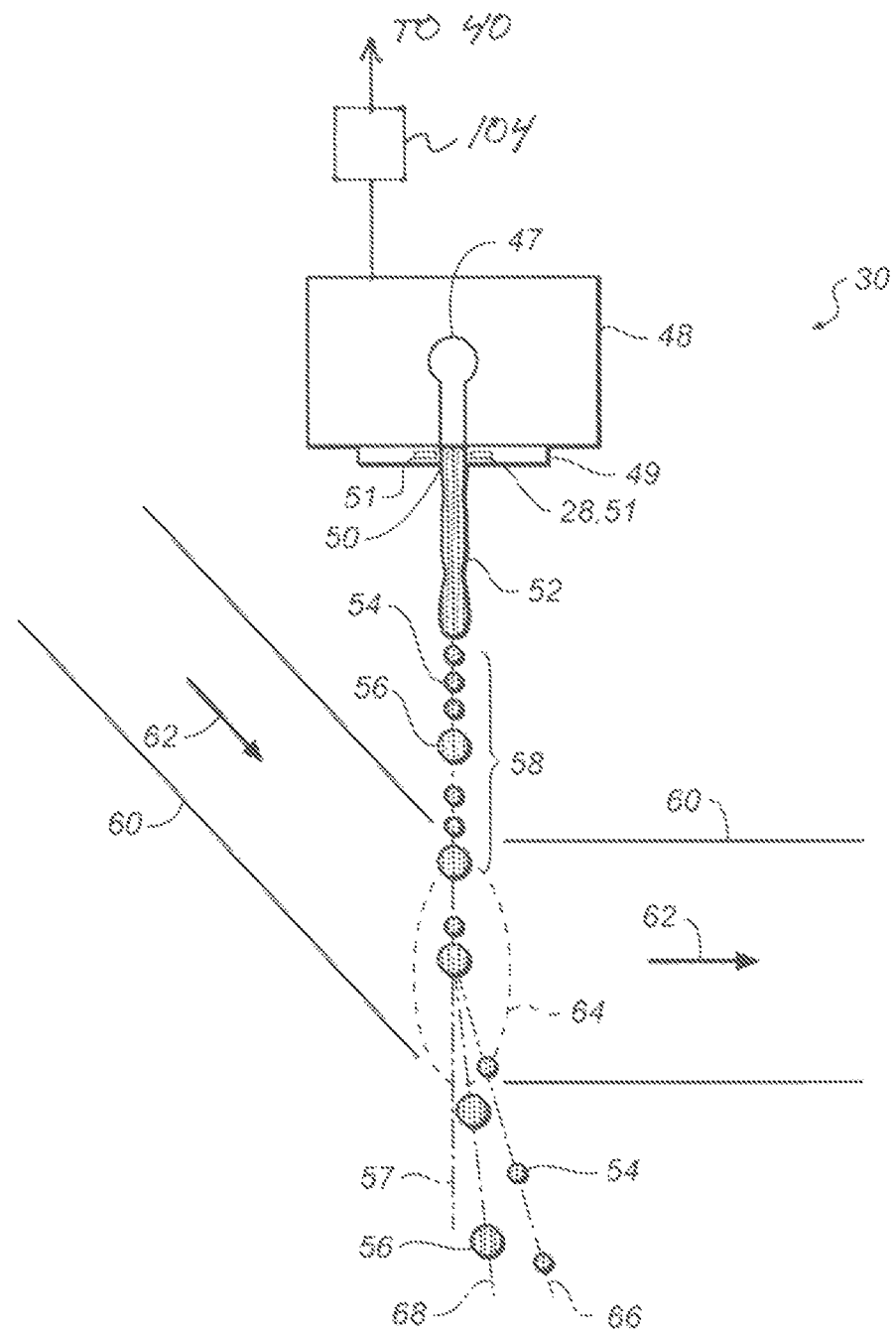
FIG. 2 is a schematic view of an example embodiment of a continuous printhead made in accordance with the present invention.

Referring to FIG. 2, a schematic view of continuous liquid printhead 30 is shown. A jetting module 48 of printhead 30 includes an array or a plurality of nozzles 50 formed in a nozzle plate 49. In FIG. 2, nozzle plate 49 is affixed to jetting module 48. However, nozzle plate 49 can be an integral portion of the jetting module 48. Liquid, for example, ink, is emitted under pressure through each nozzle 50 of the array to form filaments of liquid 52. In FIG. 2, the array or plurality of nozzles extends into and out of the figure.

Jetting module 48 is operable to form liquid drops having a first size or volume and liquid drops having a second size or volume through each nozzle. To accomplish this, jetting module 48 includes a drop stimulation or drop forming device 28, for example, a heater or a piezoelectric actuator, that, when selectively activated, perturbs each filament of liquid 52, for example, ink, to induce portions of each filament to break off from the filament and coalesce to form small drops 54 and large drops 56.

In FIG. 2, drop forming device 28 is a heater 51, for example, an asymmetric heater or a ring heater (either segmented or not segmented), located in a nozzle plate 49 on one or both sides of nozzle 50. This type of drop formation is known and has been described in, for example, U.S. Pat. Nos. 6,457,807 B1, 6,491,362 B1, 6,505,921 B2, 6,554,410 B2, 6,575,566 B1, 6,588,888 B2, 6,793,328 B2, 6,827,429 B2, and 6,851,796 B2. Typically, one drop forming device 28 is associated with each nozzle 50 of the nozzle array. However, a drop forming device 28 can be associated with groups of nozzles 50 or all of nozzles 50 of a nozzle array.

When printhead 30 is in operation, drops 54, 56 are typically created in a plurality of sizes or volumes, for example, in the form of large drops 56, a first size or volume, and small drops 54, a second size or volume. The ratio of the mass of the large drops 56 to the mass of the small drops 54 is typically approximately an integer between 2 and 10. A drop stream 58 including drops 54, 56 follows a drop path or trajectory 57.

Printhead 30 also includes a gas flow deflection mechanism 60 that directs a flow of gas 62, for example, air, past a portion of the drop trajectory 57. This portion of the drop trajectory is called the deflection zone 64. As the flow of gas 62 interacts with drops 54, 56 in deflection zone 64 it alters the drop trajectories. As the drop trajectories pass out of the deflection zone 64 they are traveling at an angle, called a deflection angle, relative to the undeflected drop trajectory 57.

Small drops 54 are more affected by the flow of gas than are large drops 56 so that the small drop trajectory 66 diverges from the large drop trajectory 68. That is, the deflection angle for small drops 54 is larger than for large drops 56. The flow of gas 62 provides sufficient drop deflection and therefore sufficient divergence of the small and large drop trajectories so that catcher 42 (shown in FIGS. 1 and 3) can be positioned to intercept one of the small drop trajectory 66 and the large drop trajectory 68 so that drops following the trajectory are collected by catcher 42 while drops following the other trajectory bypass the catcher and impinge a recording medium 32 (shown in FIGS. 1 and 3).

When catcher 42 is positioned to intercept large drop trajectory 68, small drops 54 are deflected sufficiently to avoid contact with catcher 42 and strike the print media. As the small drops are printed, this is called small drop print mode. When catcher 42 is positioned to intercept small drop trajectory 66, large drops 56 are the drops that print. This is referred to as large drop print mode.

Figure 3:
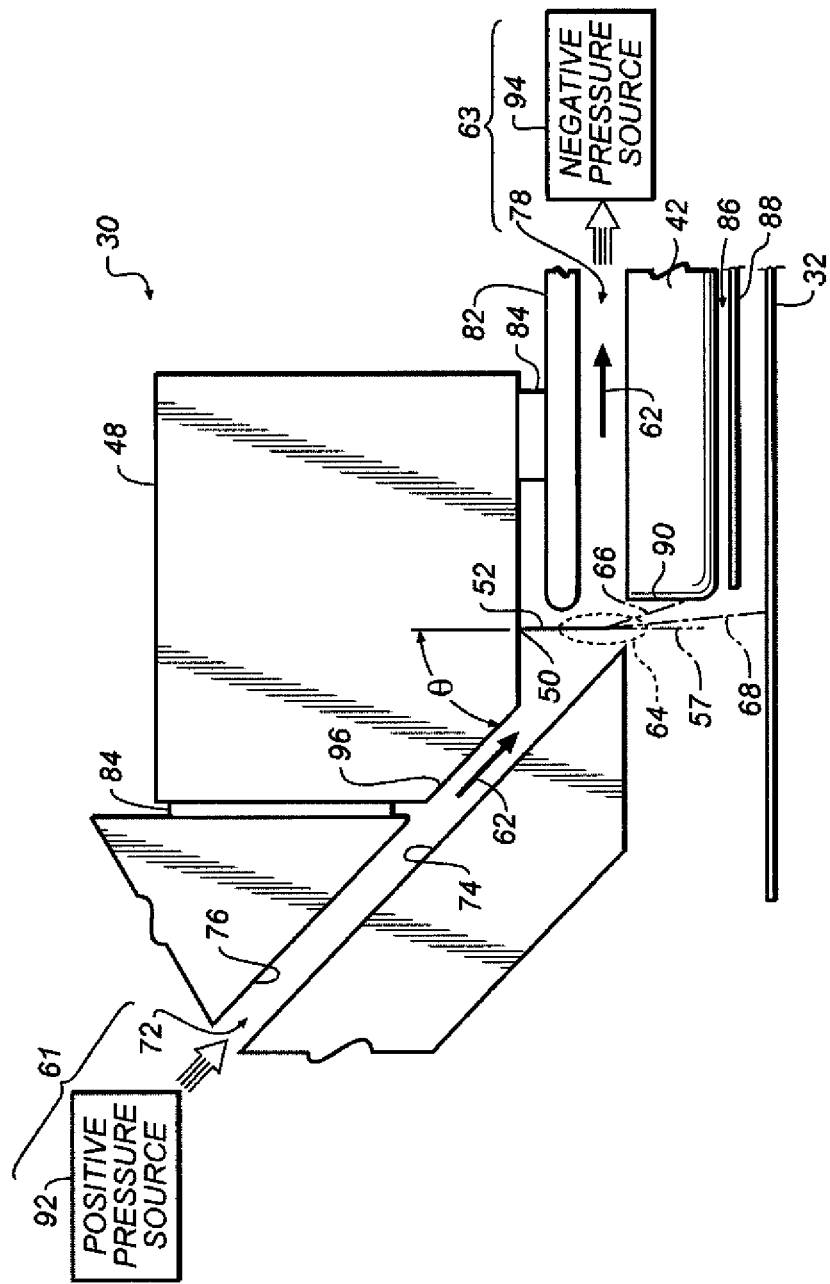
FIG. 3 is a schematic view of an example embodiment of a continuous printhead made in accordance with the present invention.

Referring to FIG. 3, jetting module 48 includes an array or a plurality of nozzles 50. Liquid, for example, ink, supplied through channel 47 (FIGS. 1 and 2), is emitted under pressure through each nozzle 50 of the array to form filaments of liquid 52. In FIG. 3, the array or plurality of nozzles 50 extends into and out of the figure.

Drop stimulation or drop forming device 28 (shown in FIGS. 1 and 2) associated with jetting module 48 is selectively actuated to perturb the filament of liquid 52 to induce portions of the filament to break off from the filament to form drops. In this way, drops are selectively created in the form of large drops and small drops that travel toward a recording medium 32.

Positive pressure gas flow structure 61 of gas flow deflection mechanism 60 (FIG. 2) is located on a first side of drop trajectory 57. Positive pressure gas flow structure 61 includes first gas flow duct 72 that includes a lower wall 74 and an upper wall 76. Gas flow duct 72 directs gas flow 62 supplied from a positive pressure source 92 at downward angle θ of approximately a 45° relative to liquid filament 52 toward drop deflection zone 64 (also shown in FIG. 2). An optional seal(s) 84 provides an air seal between jetting module 48 and upper wall 76 of gas flow duct 72. In FIG. 3, wall 96 of jetting module 48 serves as a portion of upper wall 76 ending at drop deflection zone 64.

Negative pressure gas flow structure 63 (FIG. 3) of gas flow deflection mechanism 60 (FIG. 2) is located on a second side of drop trajectory 57. Negative pressure gas flow structure includes a second gas flow duct 78 located between catcher 42 and an upper wall 82 that exhausts gas flow from deflection zone 64. Second duct 78 is connected to a negative pressure source 94 that is used to help remove gas flowing through second duct 78. An optional seal(s) 84 provides an air seal between jetting module 48 and upper wall 82.

As shown in FIG. 3, the gas flow deflection mechanism includes positive pressure source 92 and negative pressure source 94. However, depending on the specific application contemplated, the gas flow deflection mechanism can include only one of positive pressure source 92 and negative pressure source 94.

Gas supplied by first gas flow duct 72 is directed into the drop deflection zone 64, where it causes large drops 56 to follow large drop trajectory 68 and small drops 54 to follow small drop trajectory 66. As shown in FIG. 3, small drop trajectory 66 is intercepted by a front face 90 of catcher 42. Small drops 54 contact face 90 and flow down face 90 and into a liquid return duct 86 located or formed between catcher 42 and a plate 88. Collected liquid is either recycled and returned to ink reservoir 40 (shown in FIG. 1) for reuse or discarded. Large drops 56 bypass catcher 42 and travel on to recording medium 32. Thus, FIG. 3 depicts operation in a large drop print mode. Alternatively, catcher 42 can be positioned to intercept large drop trajectory 68. Large drops 56 contact catcher 42 and flow into a liquid return duct located or formed in catcher 42. Collected liquid is either recycled for reuse or discarded. Small drops 54 bypass catcher 42 and travel on to recording medium 32.

Alternatively, deflection can be accomplished by applying heat asymmetrically to filament of liquid 52 using an asymmetric heater 51. When used in this capacity, asymmetric heater 51 typically operates as the drop forming mechanism in addition to the deflection mechanism. This type of drop formation and deflection is known having been described in, for example, U.S. Pat. No. 6,079,821, issued to Chwalek et al., on Jun. 27, 2000. Deflection can also be accomplished using an electrostatic deflection mechanism. Typically, the electrostatic deflection mechanism either incorporates drop charging and drop deflection in a single electrode, like the one described in U.S. Pat. No. 4,636,808, or includes separate drop charging and drop deflection electrodes.

As shown in FIG. 3, catcher 42 is a type of catcher commonly referred to as a "Coanda" catcher. However, the "knife edge" catcher shown in FIG. 1 and the "Coanda" catcher shown in FIG. 3 are interchangeable and either can be used usually the selection depending on the application contemplated. Alternatively, catcher 42 can be of any suitable design including, but not limited to, a porous face catcher, a delimited edge catcher, or combinations of any of those described above.

The printing system of the invention utilizes one or more fluid systems that provide inkjet ink composition recycling. The invention is directed at aqueous inkjet inks, but it is applicable to organic solvent based inkjet inks with suitable modifications obvious to those skilled in the art. Useful ink agitation, heated ink supply, vacuum regulation, printhead supply and fluid filtration means for CU pigmented inkjet ink compositions are described in U.S. Pat. No. 5,394,177 to McCann et al., U.S. Pat. No. 6,352,339 B1 to Loyd et al., U.S. Pat. No. 6,817,705 B1 to Crockett et al., and U.S. Pat. No. 7,163,283 B2 to Loyd et al., and European Patent 1 403 061 B1 to Woolard et al., the disclosures of which are herein incorporated by reference. Additional printer replenishing system approaches for maintaining ink quality and countering the effects of volatile ink component evaporation are described in U.S. Pat. No. 5,473,350 to Mader et al. Further useful continuous inkjet fluid systems based on replenishment schemes that measure fluid electrical resistivity are described in U.S. Pat. No. 5,526,026, and in EP 0 597 628 B1, the disclosures of which are herein incorporated by reference in their entirety. Useful supporting concepts for continuous inkjet fluid systems that employ other means ink concentration sensing are disclosed in EP 0 571 784 B1 and EP 1 013 450 B1 and in U.S. Pat. No. 7,221,440 B2, the disclosures of which are also incorporated herein in their entirety by reference. A fluid system suitable for flushing the continuous inkjet printhead with a cleaning fluid to maintain clean nozzles that jet accurately is described in U.S. Pat. No. 6,273,103 B1 to Enz et al., and its disclosure is incorporated herein by reference.

In accordance with the present invention, the liquid ink supplied to the nozzle from the liquid ink source is in-line filtered with a filter 104 (shown in FIG. 2) selected to be effective at retaining particles having particle sizes of as small as 0.6 micrometers from the liquid ink and to pass the dispersed pigment particles, more preferably to be effective at retaining particles having particle sizes of as small as 0.5 micrometers and most preferably as small as 0.45 micrometers. While in-line filters have traditionally been employed so as to protect against nozzle plugging which may be caused by adventitious contamination of the ink by larger particles (e.g., filters with a particle removal rating of 0.8 to 1.2 micrometers as noted in U.S. Pat. No. 7,163,283), the printing system of the invention utilizes in-line fluid filtration with filters having smaller size particle removal ratings to solve a distinct problem of reducing undesired small drop merger in continuous inkjet printing systems employing bimodal drop generation with pigmented inks comprising polymer additives. More particularly, filter selection in the present invention is designed to reduce passage of oversize particles (relative to the fresh ink particle distribution) which may be generated from the pigmented ink itself by colloidal instability to the fluidic system transport forces (e.g., shear forces) resulting in particle aggregation, or by drying of the ink in exposed areas, as in droplet flight, on the catcher face, or in the return line. Maintenance cleaning cycles of the hardware surfaces such as the exterior nozzle plate, the catcher duct assembly, etc. that bear dried ink residues, will introduce particles into fluid drains and waste lines. Incomplete flushing of the printhead fluid drains may inadvertently return particles to the ink reservoir rather than to the waste tank. Dried ink particles are unlikely to naturally redisperse themselves to the original particle size distribution of the ink without a supplemental mechanical process. The shear forces of gear pumps pressurizing the pigmented ink cannot be relied upon to redisperse dried ink particles, especially since the ink may be destabilized into particle aggregation adding oversize particles to the fluid stream by the same forces.

In the process of pigmented ink fluid filtration, a fluid stream is directed at a porous medium typically comprised of synthetic organic polymer or matted glass fibers in sheets, supported by structural elements and contained in a housing, with at least a fluid inlet and a fluid outlet, and preferably with a drain and a vent. Helpful background information on membrane filtration can be obtained in "Microfiltration and Ultrafiltration: Principles and Applications", L. J. Zeman and A. L. Zydney, Marcel Dekker, Inc., New York, 1996, and in "Review: Bioprocess Membrane Technology", R. van Reis and A. Zydney, *Journal of Membrane Science*, 297 (2007) 16-50.

In one embodiment of the invention, an ink reservoir is fed when emptied by an external ink source and the head space is evacuated by a vacuum pump. The ink reservoir supplies ink to the inlet of an ink pump. The ink pump outlet discharges pressurized ink into the inlet of a filter housing. The ink passes through at least one filter medium that at least partially depletes it of any oversize particles that may be present, and it passes through the outlet of the filter housing. The filtered ink is supplied to a printhead assembly employing a jetting module and it is jetted through a nozzleplate with stimulation means to form large printing ink drops and small non-printing ink drops. A catcher assembly receives deflected non-printing drops on a catcher face and a gutter collects the fluid flowing down the face. A tube receiving collected ink from the gutter returns the unused ink to the ink reservoir under partial vacuum.

The continuous inkjet printer fluid system filtration requirements are conventionally determined by the size of the nozzleplate orifices used to jet the ink. The object of conventional CIJ fluid filtration is to remove particles from the liquid ink that are capable of blocking the orifices, resulting in a crooked or missing jet. Continuous inkjet printheads typically are monolithic arrays without any redundant nozzles, and a partially or completely blocked nozzle produces a printing defect that cannot be corrected. In addition, the jetting module or printhead assembly containing the blocked nozzleplate will have irreparably failed if the blockage cannot be reversed by a cleaning cycle or by cross-flushing. U.S. Patent Application No. 2011/0205319 A1 to Vaeth et al., the disclosure of which is incorporated by reference, teaches that the effective diameter of a continuous inkjet filter membrane pore should be less than ½, and preferably less than ⅓, of the effective diameter of the orifice of the nozzleplate nozzle to trap particulate material in the liquid. Those skilled in the art may chose to employ an effective filter membrane pore rating up to 1/10 of the effective orifice size, based on the principle elaborated in Zeman and Zydney, ibid., p. 584. Continuous inkjet effective nozzle diameters can vary greatly in size, depending on the application of the printer. Continuous inkjet nozzle effective diameters can be as large as about 90 micrometers for low addressability industrial imprinters producing large spot sizes with low resolution and image quality, and as small as about 8 or 9 micrometers for high addressability printers providing small spot sizes, high resolution and near-photographic image quality. The liabilities of employing small effective pore size filter membranes include the cost of membrane fabrication, the increase in pressure drop across the membrane as liquid flows through its constrictions due to its reduced permeability, the requirement for high surface areas bearing more pores to offset the reduced permeability, and the potential for reduced filter lifetime due to blocking. Thus a typical system filter effective membrane pore rating as has been previously employed for a high addressability printer can be about 1.0 micrometer.

The effective membrane pore rating is understood by those skilled in the art to denote the effective particle removal or retention rating of a filter membrane, and the terms are sometimes used interchangeably. The membrane particle removal rating is typically determined by filter medium manufacturer by particle retention studies, exemplified by the following publications: Pall Corp. Publication FBFSMEN; K. Sutherland, "Filters and Filtration Handbook, Fifth Ed.", Elsevier Science, Oxford, 2008, p. 20-40; and D. C. Grant and B. Y. H. Lui, *Part. Part. Syst. Charact.*, 8 (1991) 142-150. While various filter manufacturers may use different tests to assign a filter effective pore size rating (e.g., "absolute" ratings designed to state the smallest size particles which will not pass through a filter under specified conditions, or "nominal" ratings designed to reflect size of particles which are effectively retained at at least a specified high percentage (e.g., at least 90%, or at least 99%, or at least 99.9%) under specified conditions, or "microbial" ratings designed to reflect effectively complete filtering of microbes having a specified size under specified conditions), any filter having a manufacturer's filter pore size rating of 0.6 micrometers or smaller based on any of these typical manufacturer ratings criteria should be effective at filtering at least a majority of particles having a size of 0.6 micrometers and larger, and thus be useful in the present invention. In a preferred embodiment, an in-line filter having an effective pore size rating of 0.5 micrometer or smaller, and more preferably 0.45 micrometer or smaller is employed. To maintain ability to pass the dispersed pigment particles having a mean particle size of less than 150 nanometers, it is further preferred that the in-line filter not have a filter pore size rating smaller than the mean particle size of the dispersed pigment. Preferred filters in one embodiment may thus be employed which have a pore size rating of from 0.2 to 0.6 micrometer, more preferably of from 0.2 to 0.5 micrometer, and most preferably from 0.2 to 0.45 micrometer. Such filters are preferably employed in the present invention with jetting modules having nozzles with an effective orifice diameter of greater than or equal to 8 micrometers, more preferably greater than or equal to 9 micrometers, and wherein the ratio of the effective orifice diameter of the nozzle to the effective pore size rating of the filter is greater than 10, or even greater than 15 or greater than 20.

The ink pump is desirably a gear pump that can produce high pressures with minimal pulsations to impart the necessary momentum to the drops. In another embodiment, the pump is a low shear diaphragm pump.

The inkjet printing fluids employed in the present invention are aqueous-based printing fluids designed for use in relatively high-speed continuous inkjet (CIJ) printing systems as described above. By aqueous-based it is meant that the printing fluid comprises mainly water as the carrier medium for the remaining printing fluid components. In a preferred embodiment, the printing fluids of the present invention comprise at least about 50-weight percent water. Pigment-based inks are defined as inks containing at least a dispersion of water-insoluble pigment particles. Dye-based inks are defined as inks containing at least a colored molecular dye, which is soluble in the aqueous carrier. Colorless inks are defined as inks, which are substantially free of colorants such as dyes or pigments and as such, are not intended to contribute to color formation in the image forming process.

In contrast to sheet-fed drop-on-demand printing, CIJ is a very high speed printing process, and it is desired to operate at substrate transport speeds in excess of 100 feet/minute (FPM) and at addressabilities higher than 300×300 dpi. Printing speed alone imposes some limitations on ink formulation relative to slower drop-on-demand printing techniques, simply on the basis of the short time requirements for adequately drying the printed substrate moving at full speed in the press before roll wind-up. Surprisingly, however, features of CIJ printhead operation can allow wider ink formulation latitude than is possible in drop-on-demand (DOD) printing in other respects. Ink formulation considerations specific to traditional CIJ printing are described in W. Wnek, *IEEE Trans.* 1986, 1475-81, which elucidates the ink performance requirements for drop formation, deflection and catching of non-printing drops, recirculation of the ink to the printhead from the storage reservoir for future printing, and also for commercial ink-media image quality and durability.

An inkjet ink composition for use in a continuous inkjet printer desirably contains water as the principal vehicle or carrier medium, colorant, humectant, biocide, and surfactant; it can desirably further contain one or more types of other components, including and not limited to a film-forming binder or mordant, a solubilizing agent, a co-solvent, a base, an acid, a pH buffer, a wetting agent, a chelating agent, a corrosion inhibitor, a viscosity modifier, a penetrant, a wetting agent, an antifoamant, a defoamer, an antifungal or antibacterial agent, a jetting aid, a filament length modifier, a trace of multivalent cationic flocculating salt, a solution conductivity control agent, or a compound for suppressing electrostatic deflection charge shorts when ink dries on the charge ribbon electrodes, if that mode of drop deflection is to be employed.

In various embodiments, the invention employs dispersed pigment particles as colorants, and in particular dispersed black pigment particles in a black ink formulated for continuous inkjet printing, and dispersed black, cyan, magenta, and yellow pigment particles in black, cyan, magenta, and yellow inks of an ink set formulated for inkjet printing.

Pigment-based ink compositions useful in the invention may be prepared by any method known in the art of ink jet printing. Useful methods commonly involve two steps: (a) a dispersing or milling step to break up the pigment aggregate into primary particles, where primary particle is defined as the smallest identifiable subdivision in a particulate system, and (b) a dilution step in which the pigment dispersion from step (a) is diluted with the remaining ink components to give a working strength ink. The pigment milling step (a) may be carried out using any type of grinding mill such as a stirred media mill, a ball mill, a two-roll mill, a three-roll mill, a bead mill, and air-jet mill, an attritor, a high speed disperser, a horizontal mill, or a liquid interaction chamber. In the milling step (a), pigments are optionally suspended in a medium, which is typically the same as, or similar to, the medium used to dilute the pigment dispersion in step (b). Inert milling media are optionally present in the milling step (a) in order to facilitate breakup of the pigments to primary particles. Inert milling media include such materials as polymeric beads, glasses, ceramics, metals and plastics as described, for example, in U.S. Pat. No. 5,891,231. Milling media are removed from either the pigment dispersion obtained in step (a) or from the ink composition obtained in step (b). Related milling, dispersing, grinding or comminution processes that are highly suitable to the practice of the invention are described in U.S. Pat. Nos. 5,478,705 A, 5,513,805 A, 5,662, 279 A, 5,679,138 A, 5,862,999 A, 5,985,071 A, and 6,600,559 B2. A particularly preferred milling process is disclosed in U.S. Pat. No. 7,441,717 B1 issued to Majka et al., and its disclosure is herein incorporated by reference.

A dispersant is preferably present in the milling step (a) in order to facilitate breakup of the pigment agglomerate into primary particles. For the pigment dispersion obtained in step (a) or the ink composition obtained in step (b), the dispersant is present in order to maintain particle stability and to prevent particle aggregation followed by settling; the dispersant may either be an amphiphilic molecular surfactant or a polymer. In addition to the dispersant, there may be, optionally, additional dispersants or polymers present for use in the invention such as those commonly used in the art of ink jet printing. For aqueous pigment-based ink compositions, useful dispersants include anionic, or nonionic surfactants such as sodium dodecyl sulfate, or potassium or sodium oleylmethyltaurate as described in, for example, U.S. Pat. Nos. 5,679,138, 5,651, 813, and 5,985,017.

Pigment colorants employed in inks of the invention are desirably dispersed using an amphiphilic polymeric dispersant. While a polymeric dispersant is desirable, there is no requirement that the pigmented ink jet ink composition of the invention contain a polymeric material as a pigment dispersant, as long as a stable dispersion of the pigment is provided such that the ink is stable to recirculation in a continuous inkjet printing system. The polymeric dispersant desirably comprises at least one hydrophobic monomer. The hydrophobic monomer used to prepare the polymeric dispersant is comprised of a carboxylic acid ester-containing functional group. The hydrophobic monomers may be selected from any aliphatic acrylate or methacrylate monomer. In a preferred embodiment, it contains an aliphatic chain comprising greater than or equal to as few as 12 carbon atoms, which may be linear or branched. Specific examples of useful hydrophobic monomers include the following: lauryl acrylate, lauryl methacrylate, tridecyl acrylate, tridecyl methacrylate, tetradecyl acrylate, tetradecyl methacrylate, cetyl acrylate, isocetyl acrylate, stearyl methacrylate, iso-stearyl methacrylate, stearyl acrylate, stearyl methacrylate, decyltetradecyl acrylate, decyltetradecyl methacrylate, and the like. Preferably the methacrylate or acrylate monomer is stearyl or lauryl methacrylate or acrylate. The hydrophobic portion of the polymer may be prepared from one or more of the hydrophobic monomers.

Desirably, the hydrophobic monomer having a carbon chain length of greater than or equal to 12 carbons is present in an amount of at least 10% by weight of the total copolymer, and more preferably greater than 20% by weight. The copolymer may also comprise a hydrophobic monomer comprising an aromatic group. For example, the additional aromatic group containing monomer may be benzyl acrylate or benzyl methacrylate.

The total amount of hydrophobic monomers, comprising the monomer having a chain with greater than or equal to 12 carbons and optionally, monomer containing an aromatic group, are preferably present in the polymer in an amount of 20 to 95% by weight of the total polymer. The hydrophobic aromatic-group containing monomer may be present in an amount from about 0 to 85% by weight of the total polymer, more preferably from about 0 to 60%, and most preferably from about 0 to 50%. Preferred copolymer dispersants are those where the hydrophilic monomer is selected from carboxylated monomers. Preferred polymeric dispersants are copolymers prepared from at least one hydrophilic monomer that is an acrylic acid or methacrylic acid monomer, or combinations thereof. Preferably, the hydrophilic monomer is methacrylic acid. Particularly useful polymeric pigment dispersants are further described in US 2006/0012654 A1, US 2006/0014855 A1, US 2007/0043144 A1, and US 2007/0043146 A1, the disclosures of which are incorporated herein by reference.

The monomers comprising the polymeric dispersant may be totally random, or they may be arranged in blocks such as AB or ABA wherein, A is the hydrophobic monomer and B is the hydrophilic monomer. In addition, the polymer make take the form of a random terpolymer or an ABC triblock wherein, at least one of the A, B and C blocks is chosen to be the hydrophilic monomer and the remaining blocks are hydrophobic blocks dissimilar from one another. Preferably the copolymer is a random copolymer or terpolymer.

Typically, the weight average molecular weight of the copolymer dispersant has an upper limit such that it is less than about 50,000 daltons. Desirably the weight average molecular weight of the copolymer is less than about 25,000 daltons; more preferably it is less than 15,000 and most preferably less than 10,000 daltons. The molecular weight of the binder or dispersant has a weight average molecular weight lower limit such that it is greater than about 500 daltons.

A wide variety of organic and inorganic pigments, alone or in combination with each other, may be used in the ink composition of the present invention. For example, a carbon black pigment may be combined with a colored pigment such as a cyan copper phthalocyanine or a magenta quinacridone pigment in the same ink composition. Pigments that may be used in the invention include those disclosed in, for example, U.S. Pat. Nos. 5,026,427, 5,086,698, 5,141,556, 5,160,370, and 5,169,436. The exact choice of pigments will depend upon the specific application and performance requirements such as color reproduction and image stability.

Pigment colorants suitable for use in the invention include, but are not limited to, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Carbon black is preferable as a pigment for black ink. Carbon black pigment may be produced by any available process and useful pigments include furnace blacks, lamp blacks, acetylene blacks, channel blacks and gas blacks. Especially suitable carbon black pigments include NIPex® 160 IQ, NIPex 170 IQ, NIPex 180 IQ and Colour Black FW 2, Colour Black FW 200, Colour Black FW 285, Colour Black FW 1, Colour Black FW 18, Colour Black FW, Colour Black FW 18, Printex® 95 pigments produced by Orion Engineered Carbons, and Black Pearls® 1100, Black Pearls 900, Black Pearls 880, Black Pearls 600, Monarch® 1100, and Monarch 900 pigments by Cabot Corp. Other black pigments are also acceptable and may be comprised of magnetic particles such as magnetite or ferrite, or titanium black may also be used.

Typical examples of pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42. The pigmented ink jet ink composition of the invention for use in a continuous ink jet printer in a particular embodiment can be comprised of an additional water soluble dye colorant, as disclosed in EP 1 132 440 A2 to Botros et al., and EP 0 859 036 A1 to J-D. Chen.

The inks employed in the invention may alternatively or additionally comprise self-dispersing pigments that are dispersible and stable without the use of a polymeric or molecular dispersant or surfactant. Pigments of this type are generally those that have been subjected to a surface treatment such as oxidation/reduction, acid/base treatment, or functionalization through coupling chemistry. The surface treatment can functionalize the surface of the pigment with anionic, cationic or non-ionic groups. Examples of suitable self-dispersing type black pigments include, but are not limited to, Cab-O-Jet® 200, Cab-O-Jet® 300, Cab-O-Jet® 352K, Cab-O-Jet® 400 (Cabot Corp.) and Bonjet® Black CW-1, CW-1S, CW-2, and CW-3 (Orient Chemical Industries, Ltd.).

The pigment particles of the pigment-based continuous ink jet ink composition employed in embodiments of the present invention preferably have a median particle diameter of less than about 150 nm and more preferably less than 100 nm, and most preferably less than about 50 nm. As used herein, median particle diameter refers to the 50th percentile of the classified particle size distribution such that 50% of the volume of the particles is provided by particles having diameters smaller than the indicated diameter. Particularly desirable pigment particle sizes are those that satisfy the particle Peclet number requirements for stable continuous ink jet fluid drop formation properties, as taught in WO 2009/044096 by Clarke et al.

The pigments used in the ink composition of the invention may be present in any effective amount, generally from 0.1 to 10% by weight, and preferably from 0.5 to 6% by weight. In one embodiment the weight ratio of the polymeric dispersant to the pigment is 0.15 to 0.9.

The inks employed in the invention could also optionally comprise, in addition to the pigment dispersion, dyes known in the art of ink jet printing. For aqueous-based ink compositions dyes suitable for use in the invention include, but are not limited to, water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes and the like. Specific examples of dyes usable in the present invention are as follows: yellow dyes including: C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165; C.I. Direct Yellow 1, 8, 11, 12, 24, 26, 27, 33, 39, 44, 50, 58, 85, 86, 87, 88, 89, 98, 110, 132, 142, and 144; C.I. Reactive Yellow 1, 2, 3, 4, 6, 7, 11, 12, 13, 14, 15, 16, 17, 18, 22, 23, 24, 25, 26, 27, 37, and 42; and C.I. Food Yellow 3 and 4; magenta dyes including: C.I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322; C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, and 64; and C.I. Food Red 7, 9, and 14; cyan dyes including: C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, and 249; C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, and 46; and C. I. Food Blue 1 and 2; black dyes including: C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, and 191; C.I. Direct Black 17, 19, 22, 32, 39, 51, 56, 62, 71, 74, 75, 77, 94, 105, 106, 107, 108, 112, 113, 117, 118, 132, 133, 146, 154, and 168; C.I. Reactive Black 1, 3, 4, 5, 6, 8, 9, 10, 12, 13, 14, 31, and 18; and C.I. Food Black 2, CAS No. 224628-70-0 sold as JPD Magenta EK-1 Liquid from Nippon Kayaku Kabushiki Kaisha; CAS No. 153204-88-7 sold as Intrajet® Magenta KRP from Crompton and Knowles Colors; the metal azo dyes disclosed in U.S. Pat. Nos. 5,997,622 and 6,001,161.

The pigment-based continuous ink jet ink compositions employed in embodiments of the present invention further comprise at least about 0.1 wt % of polymer additive which is distinct from any polymer dispersant which may be used to disperse the pigment particles, more preferably at least about 0.5 wt % and most preferably at least about 1 wt % of polymer additive which is distinct from any polymer dispersant which may be used to disperse the pigment particles. The polymer additives can act as ingredient binders which may form films and increase printed image dry physical or wet durability, as fluid system recirculation stabilizers, as jetting-aids, as surface active and surface modifying agents, or they can fulfill other useful functions. These polymers may be classified as water-soluble polymers, water-reducible polymers or water-dispersible polymeric particles. While useful for such various purposes, such polymer additives have been discovered to create new problems in continuous inkjet ink systems employing bimodal drop size generation and recirculating ink systems, which new problems are solved by filter selection in accordance with the present invention.

By the term "water-soluble" is meant that the polymer is dissolved in water such that scattering is not observed when a dilute solution of the polymer is analyzed using dynamic light scattering or any other technique well known in the art of particle analysis.

By the term "water-reducible" is meant that the polymer can be diluted with water to form reasonably stable dispersions of polymer aggregates swollen by solvent and water, as described in "Organic Coatings: Science and Technology" (2nd Edition by Wicks, Jones and Papas, published by Wiley-Interscience, 1999). Such polymers can have hydrophilic acid groups in some monomers, but are not water soluble until partially or fully neutralized by base.

By the term "water-dispersible" is meant that the polymer exists in i the form of discrete particles in water, the particles being dispersed or suspended and often stabilized against flocculation and settling by the use of dispersing agents. In contrast to a water-soluble polymer, a dilute solution of a water-dispersible polymer exhibits scattering when analyzed using dynamic light scattering or any other technique well known in the art of particle analysis.

Polymers useful in the ink compositions of the invention, in addition to the polymeric dispersants described above, include nonionic, anionic, and amphoteric polymers. Representative examples of water soluble polymers include, polyvinyl alcohols, polyvinyl acetates, polyvinyl pyrrolidones, carboxymethyl cellulose, polyethyloxazolines, and polyamides. Representative examples of water-reducible polymers include alkali soluble resins, polyurethanes (such as those found in U.S. Pat. No. 6,268,101), polyacrylic acids, styrene-acrylic methacrylic acid copolymers (such as Joncryl® 70 from BASF Corp., TruDot® IJ-4655 from MeadWestvaco Corp., and Vancryl® 68S from Air Products and Chemicals, Inc) and polymers exemplified in U.S. Pat. No. 6,866,379 and U.S. Patent Application No 2005/0134665 A1.

The water-dispersible polymer particles are generally classified as either addition polymers or condensation polymers, both of which are well known to those skilled in the art of polymer chemistry. Examples of water-dispersible polymer particle classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric; film-forming, non-film-forming, fusible, or heavily cross-linked and can have a wide range of molecular weights and glass transition temperatures. Examples of water dispersible polymeric particles used in inkjet inks are styrene-acrylic copolymers sold under the trade names Joncryl® (BASF Corp.), Ucar™ (Dow Chemical Co.), Jonrez® (MeadWestvaco Corp.), and Vancryl® (Air Products and Chemicals, Inc.); sulfonated polyesters sold under the trade name Eastman AQ® (Eastman Chemical Co.); polyethylene or polypropylene resin emulsions and polyurethanes (such as the Witcobonds® from Witco Corp.). These polymeric particles are preferred because they are compatible in typical aqueous-based ink compositions, and because they render printed images that are highly durable towards physical abrasion, light and ozone.

Core-shell polymer particles have also been employed in inkjet inks for water-fastness and rub-resistance improvements (U.S. Pat. Nos. 5,814,685, 5,912,280, 6,057,384, 6,271,285, 6,858,301). Additional examples of water dispersible polymer particles include the thermoplastic resin particles as disclosed in U.S. Pat. Nos. 6,147,139 and 6,508,548. The polymer particles may be a mixture of high and low glass transition temperature polymers such as those disclosed in U.S. Pat. No. 6,498,202. Additionally, core-shell polymer particles as described in U.S. Pat. Nos. 5,814,685, 5,912,280, 6,057,384, 6,271,285, and 6,858,301 can be employed. It is also possible to include in the ink, in addition to the durability enhancing polymer particles, heavily cross-linked polymer particles.

Particularly preferred polymers for use in the black, cyan, magenta and yellow inks of the ink sets employed in embodiments of the invention are water soluble polyacrylate co-polymers and polyurethane latex binder co-polymers, which may be used alone or in mixtures. While any useful quantity of a water soluble co-polyacrylate co-polymer can be employed, the inks of the invention can preferably comprise between 0.1% and 6.0% by weight of a water soluble polyacrylate polymer. The water soluble polyacrylate polymers can be either addition polymers or condensation polymers, both of which are well known to those skilled in the art of polymer chemistry. Specific examples include, but are not limited to: acrylic acid polymer; methacrylic acid polymer; styrene-acrylic acid copolymer, styrene-acrylic acid-acrylic acid alkyl ester copolymer, styrene-maleic acid co-polymer, styrene-maleic acid-acrylic acid alkyl ester copolymer, styrene-methacrylic acid copolymer, styrene-methacrylic acid-acrylic acid alkyl ester copolymer, styrene-maleic acid hemi ester copolymer, vinyl naphthalene-acrylic acid co-polymer, vinyl naphthalene-maleic acid co-polymer and so forth. Especially preferred water soluble polyacrylate polymers include benzylmethacrylate-acrylic acid co-polymers and styrene-maleic acid hemi ester co-polymers. These polymers are rendered water soluble by the presence of the acid group originating in the acrylic acid, maleic acid or methacrylic acid moiety of the polymer. For polymers including acid groups, the extent of polymer charge stabilization is quantified as the polymer acid number (AN). A calculated polymer acid number is defined as the number of moles of acid monomer per gram of monomer in the polymer forming feedstock times 56 (which is the molecular weight of potassium hydroxide). A measured acid number is the number of moles of acid found per gram of polymer times 56, when titrating with potassium hydroxide in water. The water soluble polyacrylate polymer preferably exhibits an acid number between 100 and 400 and more preferably between 140 and 300 and a weight average molecular weight Mw between 5000 and 30,000 and more preferably between 6,000 and 16,000. Preferred polymeric binders include Joncryl 586, Joncryl 683, and Joncryl HPD 696 from BASF Corp.

Polyurethane latex binders may be formed from at least one monomer comprising at least two hydroxyl groups and at least one carboxyl group and another monomer comprising at least two isocyanate groups. While diisocyanates are typically used in the art of polyurethane chemistry, triisocyanates can also be used. Examples of diisocyanates include isophorone diisocyanate and others described in the above references. The polyurethanes which may be used in the inks employed in the invention are optionally derived from an additional monomer comprising at least two hydroxyl groups and which is different from the monomer having at least two hydroxyl groups and at least one carboxyl group. These optional monomers are typically higher molecular weight monomers having a molecular weight of less than 3000 daltons. They are often referred to in the art as polyols. Examples include polyols and polyhydroxy derivatives of polycarbonates, polyethers, polyesters, polyacetals, polyacrylates, polyester amides and polythioethers. Preferably the optional monomer is a polycarbonate or a polyether. More preferably, the optional monomer comprising at least two hydroxyl groups is a poly (hexamethylene carbonate) diol. Examples of monomers comprising at least two hydroxyl groups and at least one carboxylic acid group are 2,2-bis(hydroxymethyl) propionic acid and the hydroxyethylether of 4,4-bis(4-hydroxyphenyl)-valeric acid. Other examples are described in U.S. Pat. No. 6,268,101B2 and U.S. Patent Application No. 2003/0184629A1 and references cited therein. Water-dispersible polyurethanes are disclosed as binders in pigmented inks in U.S. Pat. No. 6,533,408, and particularly useful polyurethanes for pigmented inkjet inks which exhibit good jetting performance and good resulting image durability are described in U.S. Patent Application No. 2004/0085419A1, the disclosures of both are incorporated herein by reference. The polyurethane which may be used in the invention preferably has a weight average molecular weight, Mw, of greater than 7,500 daltons. If Mw is less than 7,500 daltons, then the inkjet ink composition may not provide adequate stain, smear and scratch resistance. An Mw of greater than 10,000 daltons is preferred. The maximum Mw of the polyurethane is not particularly limited, but is generally dictated by the physical property requirements of the composition and the method by which it will be applied, as discussed below. If the ink composition is used as an inkjet ink for a thermal printhead, then the maximum Mw of the polyurethane is preferably 50,000 daltons. The acid number of the polyurethane is provided by acid groups that are, in turn, provided by the at least one monomer comprising at least two hydroxyl groups. The acid groups are preferably carboxylic acid groups, but any type of acid groups may be used. The polyurethane latex binder can have an acid number between 50 and 200 and preferably has an acid number between 60 and 150 and most preferably between 70 and 110. The polyurethane which may be used in the invention can exhibit a glass transition temperature Tg of between 20 and 180° C., preferably a Tg of between 40 and 120° C., and more preferably a Tg of between 60 and 100° C.

While any useful quantity of a polyurethane latex binder can be employed, the cyan, magenta, yellow, and black inks of the ink set employed in the invention in a preferred embodiment each preferably comprise between 0.1 and 5% by weight, and more preferably present at between 0.5 and 3% by weight of a polyurethane latex binder.

When these kinds of polymers are employed, best results are obtained when the weight ratio of dispersed pigment to the sum of water soluble polyacrylate polymer and polyurethane latex binder is between 3:1 and 1:2. More preferably, the weight ratio of dispersed pigment to the sum of water soluble polyacrylate polymer and polyurethane latex binder is between 2:1 and 1:1. Lower quantities of polymer can cause poor film formation while higher quantities of polymer can cause poor jetting, clogging of nozzles and ink coalescence on many printing media.

Water soluble or dispersible anionically charged polymers of the type described for use as pigment dispersants may alternatively or additionally be used in printing fluid compositions employed in the invention as a polymer additive to already dispersed pigment particles to provide improved jetting performance or improved fluid stability, and improved print durability. Acrylic polymers which may be employed in the present invention are exemplified by those disclosed in U.S. Pat. No. 6,866,379, which is incorporated herein in its entirety by reference. Specific examples of preferred water-soluble polymers useful in the present invention are copolymers prepared from at least one hydrophilic monomer that is an acrylic acid or methacrylic acid monomer, or combinations thereof. The water-soluble polymer may also be a styrene-acrylic copolymer comprising a mixture of vinyl or unsaturated monomers, including at least one styrenic monomer and at least one acrylic monomer, at least one of which monomers has an acid or acid-providing group. Such polymers are disclosed in, for example, U.S. Pat. Nos. 4,529,787; 4,358,573; 4,522,992; and 4,546,160; the disclosures of which are incorporated herein by reference. Additional useful anionic charged polymers that may be used in embodiments of the invention include water dispersible polyurethanes, such as those disclosed as binders in pigmented inks in U.S. Pat. No. 6,533,408, and particularly useful polyurethanes for pigmented inkjet inks which exhibit good jetting performance and good resulting image durability are described in U.S. Patent Publication No. 2004/0085419A1, the disclosures of both are incorporated herein by reference. U.S. Patent Publication Numbers 2006/0100306 and 2006/0100308 disclose the use of polyurethanes and mixtures of polyurethanes and acrylic polymers having specified acid numbers for use in clear ink compositions, which also may be used in embodiments of the present invention.

Additional water-soluble polymer additive(s) distinct from any dispersant used to disperse the pigment can further be employed to increase the stability of the pigment dispersion particles to ink fluid recirculation by a mechanical pump through a filter (i.e., recirculating filtration) in a CIJ fluid system, as disclosed in U.S. Patent Application No. 2011/0123714 A1 to Yau et al., and in U.S. Patent Application No. 2011/0122180 A1 to Cook et al., the disclosures of both are incorporated herein by reference in their entirety. The polymer additive may comprise, e.g., a water soluble copolymer, having block or random segments comprised of styrene and acrylic monomers, where the molecular weight of the additive is greater than 1000 as described in US 2011/0122180. The polymer additive preferably has a weight average molecular weight, Mw, of from about 1,000 to 100,000 daltons, more preferably from about 1,000 to about 50,000 daltons, and typically from about 1,000 to about 23,000 daltons. Such polymer additives may comprise, e.g., one or more polystyrene or substituted polystyrene chains copolymerized with other acrylate or substituted acrylate monomers or attached to another species. In one preferred embodiment, the polymer additive may comprise a copolymer of styrene, alpha-methylstyrene, acrylic acid and trisethylenoxyacrylate. The polymer additive may alternatively comprise a water soluble block copolymer having one or more poly(ethylene oxide) block segments which in total comprise from 50 to 99 wt % of the polymer additive, and from 1 to 50 wt % of segments relatively more hydrophobic than the poly(ethylene oxide) block segments, where the molecular weight of the at least one poly(ethylene oxide) segment of the additive is greater than 500, as described in US 2011/0123714.

It is also contemplated that the ink compositions of the present invention may also contain non-colored particles such as inorganic particles or polymeric particles. The use of such particulate addenda has increased over the past several years, especially in ink jet ink compositions intended for photographic-quality imaging. Examples of inorganic particles useful in the invention include, but are not limited to, alumina, boehmite, clay, calcium carbonate, titanium dioxide, calcined clay, aluminosilicates, silica, or barium sulfate. In a representative example, U.S. Pat. No. 5,925,178 describes the use of inorganic particles in pigment-based inks in order to improve optical density and rub resistance of the pigment particles on the image-recording element. Examples of organic polymeric particles useful in the invention include; water-dispersible polymers generally classified as either addition polymers or condensation polymers, both of which are well-known to those skilled in the art of polymer chemistry. Examples of polymer classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric, film-forming, non-film-forming, fusible, or heavily cross-linked and can have a wide range of molecular weights and glass transition temperatures. U.S. Pat. No. 6,508,548 describes the use of a water-dispersible polymeric latex in dye-based inks in order to improve light and ozone resistance of the printed images. The ink composition may contain non-colored particles such as inorganic or polymeric particles in order to improve gloss differential, light and/or ozone resistance, waterfastness, rub resistance and various other properties of a printed image; see for example, U.S. Pat. Nos. 5,889,083 A, 6,598,967 A, and 6,508,548 A, and U.S. Patent Application No. 2009/0239004 A1. If present, non-colored particles used in the ink composition employed in the invention may be present in any effective amount, generally from 0.01 to 20% by weight, and preferably from 0.01 to 6% by weight. The exact choice of non-colored particles will depend upon the specific application and performance requirements of the printed image.

Additional additives which may optionally be present in an ink jet ink composition suitable for CIJ printing include thickeners, conductivity enhancing agents, anti-kogation agents, drying agents, waterfastness agents, dye solubilizers, chelating agents, binders, light stabilizers, viscosifiers or thickeners, buffering agents, anti-mold agents, anti-cockle agents, anti-curl agents, stabilizers, antifoamants and defoamers. An aqueous ink jet ink composition for use in a continuous ink jet printer desirably contains water as the principal vehicle or carrier medium, colorant, humectant, biocide, and surfactant; it can desirably further contain one or more types of other components, including and not limited to a film-forming binder or mordant, a secondary colorant, a solubilizing agent, a co-solvent, a base, an acid, a pH buffer, a wetting agent, a chelating agent, a corrosion inhibitor, a viscosity modifier, a penetrant, a wetting agent, an antifoamant, a defoamer, an antifungal or antibacterial agent, a jetting aid, a filament length modifier, a trace of multivalent cationic flocculating salt, a solution conductivity control agent, or a compound for suppressing electrostatic deflection charge shorts when ink dries on the charge ribbon electrodes. Compounds useful for increasing pigment ink dried film resistivity for suppressing charge lead shorts are described in U.S. Pat. No. 5,676,744 to Thakkar et al. Inorganic and organic ink additives useful for controlled flocculation of pigmented ink jet compositions are described in U.S. 2004/0266908.

The pH of the inkjet ink composition directed at CIJ printing is desirably adjusted from about 8 to about 12; more desirably, the pH is about 8 to 10. In order to minimize the risk of excessively protonating carboxylate anions associated with any polymeric dispersant or binder that might render the ink composition more susceptible to pigment flocculation, pH levels lower than about 7 are desirably avoided. When the ink composition is used in hardware with nickel or nickel-plated apparatus components, a metal-passivating anticorrosion inhibitor such as the sodium salt of 4- or 5-methyl-1-H-benzotriazole is desirably added and the pH adjusted to be from about 8.5 to about 9.2, and more desirably from about 10 to about 11. The inks of the invention are highly suitable for use with silicon-based MEMS devices that serve as printhead drop forming nozzleplates. Silicon devices comprising silicon and silicon dioxide layers are vulnerable in aqueous solutions to degradation by dissolution, especially at elevated temperatures; pH levels higher than about 10 can induce significant rates of etch and corrosion that may impair the operation of the device over time even at room temperature. When the ink composition is used with printheads with components fabricated from silicon that are in contact with the fluid, the ink composition pH is desirably adjusted to be from about 8 to about 10.0; more preferably, the pH ranges from about 8.0 to about 9.5, and most preferably about 8.5 to about 9.0. Silicon metal corrosion inhibitors to stabilize a MEMS-based jetting module nozzleplate are disclosed in World Patent Application No. 2010/138191 A1.

The ink desirably is stabilized by a buffer system. A useful buffer system is described in U.S. Patent Application No. 2010/0300428 A1. The preferred pH ranges of this embodiment of the invention direct the selection of organic amines to less basic examples of the class, many of which have pKa values that are higher than 10.0. A useful compilation of organic amines that describes their basicity and that provides many example amine pKa values is reported by J. W. Smith in Chapter 4, "Basicity and Complex Formation", of The Chemistry of the Amino Group, Patai, S., Ed., John Wiley and Sons: New York, 1968; pp 161-204. It is understood that the reported ideal aqueous solution pKa value is merely a guide, since the ink jet ink will contain organic solvents, micellar solution aggregates and colloidally dispersed solid phases that modify the solvation properties of the solvent and affect the functional acidity of the acid derived from the amine base. Further, the molar level of free base in relation to its conjugate acid will also affect the ink pH. Therefore it can fall within the scope of the invention to utilize organic amines with reported pKa values above and below the desired ink pH range.

In the preparation of a solution of polymeric dispersant for pigment milling or binder for ink preparation, the co-polymer formed following completed reaction of the monomers (following treatment with a polymerization initiator) is typically reacted with a base to deprotonate acidic functional groups on the hydrophilic polymer segments, such as carboxylic acid groups, in order to solubilize the polymer. Desirably the co-polymer is reacted with an organic base to deprotonate some or all of acidic functional groups. Inorganic bases such as potassium hydroxide, sodium hydroxide, lithium hydroxide or cesium hydroxide, can be satisfactorily used. Wet rub durability of the printed ink image can sometimes be improved by amine neutralization.

Organic amines are amines comprised of at least one organic substituent, and as employed in the invention the substituent is desirably an aliphatic group. In order to reduce the possibility of a chemical reaction of the amine with other ink ingredients, secondary amines are more preferred than primary amines. Most preferred are tertiary amines, where the neutral amine base has three organic substituents. The amine aliphatic group in turn may be substituted with any suitable functional groups that are compatible with the application of the ink jet ink. Specific examples include benzylamine, 2-phenylethylamine, N-methylbenzylamine, N,N-dimethylbenzylamine, N-propylbenzylamine, N-t-butyl-N-ethylaniline, cyclopentylamine, cyclohexylamine, N-,N-dimethylcyclohexylamine, trimethylamine, tri-n-butylamine, N,N-dimethyl-n-propylamine, N,N-dimethyl-1-butylamine, tetramethyldipropylenetriamine, pentamethyldipropylenetriamine, pentamethylenediethylenetriamine, 2,2,2-trifluoroethylamine, and 3,3,3-trifluoro-n-propylamine. Other examples include morpholine, N-methylmorpholine, N-ethylmorpholine, and dimethylpiperazine. More preferred are aliphatic amines substituted with hydroxyl groups, such as monoethanolamine, diethanolamine, 3-amino-1-propanol, N-methylethanolamine, N-benzyl-N-methylethanolamine, triethanolamine, 2-(2-aminoethoxy)ethanol, N,N-dimethyl-2-(2-aminoethoxy)ethanol, N-methyldiethanolamine, and N,N-dimethylethanolamine. Examples of aminopropanediol derivatives include 1-methylamino-2,3-propanediol, 1-amino-2,3-propanediol, 1-amino-2-ethyl-2,3-propanediol, 2-amino-2-methyl-1,3-propanediol, 2-amino-2-ethyl-1,3-propanediol, and 2-amino-2,3-propanediol.

A protic acid is used to generate a salt from the organic amine for a buffer system or to adjust ink or dispersion pH. Typical inorganic acids include boric, hydrochloric, nitric, phosphoric and sulfuric acids. Typical organic acids include methanesulfonic, acetic, proprionic, oxalic and lactic acids. Preferred are short chain aliphatic carboxylic acids, such as acetic acid and lactic acid. The pH of the final aqueous ink compositions of the invention may also be adjusted by the addition of organic or inorganic acids or bases. If a buffer system is to be formed, the acid desirably has a pKa of less than about 6.5, and preferably that is at least 2 units lower than that of the conjugate acid formed from the organic amine base, in order to ensure adequate reaction. The salt may be formed in situ during the mixing of the ink, or it may be prepared in advance as a dilute solution or even isolated as pure substance. Ideally the ink is comprised of the organic amine base and its conjugate acid in about equal molar proportions, and therefore the ratio of equivalents of amine base to equivalents of inorganic or organic acid used to form the conjugate acid of the amine base is preferably at least 1.3:1.0; more preferably it is about 1.5:1.0; most preferably it is about 2.0:1.0; and preferably it is less than about 3.0:1.0, and more preferably less than about 2.5:1.0. The ink may be comprised of at least about 0.03 mole per kg of monobasic organic amine to provide the desired buffered pH, or an equivalent-adjusted amount of multibasic organic amine reflecting the number of the participating basic amine groups. Desirably, the ink is comprised of at least about 0.06 mole per kg of monobasic organic amine to provide the desired pH with adequate buffer strength. The ink desirably has at least about 0.05 milliequivalents of strong acid titratable base, the majority of which is derived from the buffering organic amine. More than one organic amine can be used to achieve the desired ink buffered pH, and participating organic amines may be introduced into the ink composition through the addition of a neutralized polymer during the preparation of the pigment dispersion, or through the addition of a neutralized polymeric binder, as well as directly added or formed in situ during ink mixing.

The inclusion of charged molecules from dispersant, ionomeric binder polymers, pH buffer system and other functional ingredients that may be present increases the inkjet ink composition ionic conductivity considerably relative to the pure water vehicle. In preferred embodiments of CIJ printing, it is convenient to monitor ink conductivity with a resistivity cell in the fluid system path to determine if the ink component concentration has changed due to the evaporation of water during extended periods of jetting. If so, the ink is diluted with a replenisher fluid to restore the proper component concentrations and maintain critical fluid properties such as viscosity, which will affect drop formation. If the starting ionic conductivity of the ink is too low, however, the uptake of carbon dioxide from ingested air during ink recycling will produce carbonic acid and both lower the ink pH and increase the fluid conductivity significantly relative to the starting state, confounding the relation between conductivity and ink colorant concentration. Thus, in preferred embodiments of the invention, it is desirable for the ink composition to have a minimum conductivity of about 2.0 mS/cm at about 25° C., and more desirably a conductivity of at least about 3.3 mS/cm. These ionic conductivity values correspond to fluid resistivity values that are desirably less than about 500 ohm-cm, and more desirably less than about 300 ohm-cm, respectively, which will facilitate the determination of accurate estimates of ink component concentration. It is desirable that the ink resistivity not reach too low a value (or conversely that the ink ionic conductivity not reach too high a value), since it is appreciated that high ionic strength of the pigmented ink jet ink composition will potentially affect the colloidal stability of the dispersed particles, causing them to aggregate and the ink to fail. U.S. Publication No. 2005/0090599 describes the coagulation of aqueous dispersed pigmented ink particles by salt solutions at a concentration of 0.2 moles per liter. The ink resistivity is therefore desirably greater than about 50 ohm-cm, and more preferably it is greater than about 100 ohm-cm, and most preferably between about 200 and 300 ohm-cm.

A biocide may be added to an ink jet ink composition to suppress the growth of microorganisms such as bacteria, molds, fungi, etc. in aqueous inks. Useful preservatives are exemplified by alkylisothiazolones, chloroalkylisothiazolones, and benzisothiazolones. Preferred commercial products for use in an ink composition include Proxel® GXL (Arch Chemicals, Inc.) and Kordek® MLX (Rohm and Haas Co.) at a final concentration of 0.0001-0.5 wt. %.

Surface active molecules (i.e., surfactants) may be added to the inkjet ink composition to adjust the surface tension of the inks to appropriate levels across all surface ages, provided that they do not compromise the colloidal stability of the pigment particles, such as described in copending, commonly assigned U.S. Ser. Nos. 13/234,662, 13/234,695, and 13/234,745, the disclosures of which are incorporated by reference herein in their entireties.

The ink compositions employed in the invention further can include one or more water-soluble or polar organic compounds to serve as an humectant (also called a co-solvent) if desired in order to provide useful properties to the inkjet ink. Typical useful properties of humectant and co-solvent additives include, but are not limited to, preventing the ink composition from drying out or crusting in the nozzles of the printhead by reducing the rate of water evaporation and plasticizing the pigment cake as the ink dries; aiding the solubility of the components in the ink composition; facilitating redispersion of concentrated or dried ink in ink or CIJ cleaning fluid; modifying the fluid surface tension either directly (e.g., by reducing the chemical activity of water and surface energy at the liquid-solid or liquid-gas interface) or indirectly (e.g., by modifying the availability of surfactant in an aqueous phase); altering the fluid viscosity; aiding firing properties of the ink from an ejector; facilitating penetration of the ink composition into the image-recording element after printing; aiding gloss; and suppressing mechanical artifacts such as paper cockle and curl during and after printing.

Any water-soluble humectant or co-solvent known in the inkjet art and compatible with the other requirements of the invention can be employed. By water-soluble is meant that a mixture of the employed humectant(s) or co-solvent(s) and water is adequately homogeneous and not subject to spontaneous phase separation. While an individual humectant or co-solvent can be employed, useful inkjet ink compositions can employ mixtures of two, three or more humectants and co-solvents, each of which imparts a useful property to the inkjet ink. Representative examples of humectants and co-solvents used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, di(ethylene glycol), tri(ethylene glycol), tetra (ethylene glycol), propylene glycol, di(propylene glycol), the poly(ethylene glycol)s with average molecular weights ranging from 200 to about 5000 daltons (particularly poly(ethylene glycol)-400 (average Mn ca. 400, herein referred to as PEG-400 for convenience)), the polypropylene glycols with average molecular weights ranging from 200 to about 5000 daltons (particularly poly(propylene glycol)-425 (average Mn ca. 425)), 1,2-propanediol, 1,3-propanediol, 1,2-butanediol, 1,3-butanediol, 1,4-butanediol, 1,2,4-butanetriol, 3-methyl-1,3-butanediol, 2-methyl-1,3-propanediol, 1,5-pentanediol, 1,6-hexanediol, 2-methyl-2,4-pentanediol, 1,7-heptanediol, 2-ethyl-1,3-hexanediol, 2,2,4-trimethyl-1,3-pentanediol, 1,8-octanediol, glycerol, 1,2,6-hexanetriol, 2-ethyl-2-hydroxymethyl-propanediol, 2-methyl-2-hydroxymethyl-propanediol, saccharides and sugar alcohols and thioglycol; (3) polyoxygenated polyols and their derivatives such as diglycerol, polyglycerols, glycerol ethoxides, glycerol propoxides, glyceryths, alkylated and acetylated glyceryths, saccharide such as sorbitol or fructose, pentaerythritol, pentaerythritol ethoxides, and pentaerythritol propoxides and their alkylated and acetylated derivatives; (4) aliphatic or aromatic glycol ethers such as an aromatic glycol ether like propylene glycol phenyl ether (e.g., Dowanol™ PPh glycol ether) or aliphatic glycol ether such as propylene glycol methyl ether (Dowanol® PM), di(ethylene glycol) n-butyl ether (Butyl Carbitol™) or poly(ethylene glycol) methyl ether (average M, ca. 550); (5) nitrogen-containing compounds such as N,N-dimethylformamide, acetamide, N-methylacetamide, N,N-diethylacetamide or morpholine urea, urea, 2-pyrrolidone, N-methyl-2-pyrrolidone, imidazolidinone, N-hydroxyethyl acetamide, N-hydroxyethyl-2-pyrrolidinone, 1-(hydroxyethyl)-1,3-imidazolidinone, 1,3-dimethyl-2-imidazolidinone, and 1,3-dihydroxy-2-imidazolidinone; or polyvinylpyrrolidone; (6) sulfur-containing compounds such as 2,2'-thiodiethanol, dimethyl sulfoxide and tetramethylene sulfone; and (7) water soluble N-oxides such as 4-methylmorpholine-N-oxides. As used herein in reference to inkjet ink compositions for use in a continuous ink jet printer, particularly desirable ingredients serving primarily as a humectant to retard ink drying and aid ink redispersability include glycerol, ethylene glycol, related polyols, and the polyhydric alcohol derivatives thereof, which are preferred; glycerol is especially preferred. The polyhydric alcohol derivatives of glycerol include the glycerol ethoxides, glycerol propoxides and glyceryths. It is recognized that the effectiveness of the humectant in accomplishing water retention and wetting will depend on its chemical structure. When the humectant chemical structure produces lower water retention, higher levels of the humectant can be used without adversely affecting the drying rate of the printed ink. When the humectant or co-solvent chemical structure produces minimal effect on surface tension at any surface age, higher levels of the humectant can be used without adversely affecting desired dynamic surface tension profile of the ink. The useful humectants, co-solvents and solvo-surfactants have melting points below the typical operating temperature of the intended printer system to avoid the formation of crystalline or amorphous insoluble deposits on the printhead or in other segments of the fluid, drop formation and deflection systems. Practically, this means that the useful humectants, co-solvents and solvosurfactants have melting points below 300° C., preferably below 200° C. and more preferably below 100° C.

While any quantity of water soluble humectants and polar co-solvents either singly or in combination with dynamic surface tension reducing co-solvents and surfactants can be employed, the total humectant and co-solvent level of the ink jet ink composition for continuous ink jet printing is desirably from about 1 to about 20% by weight and more preferably less than 10% by weight. The total humectant and co-solvent level of the ink is the sum of the individual contributions of humectant or miscible polar organic co-solvent, DST-modifying co-solvent (solvosurfactant), and any other co-solvent ingredients, which may include humectant or organic co-solvent added directly or incidentally during the totality of ink formulation (for example, co-solvent associated with a commercial biocide preparation as a supplemental ingredient, or with a commercial pigment dispersion preparation that may be present to prevent so-called "paint-flakes" of dried pigment cake forming around a bottle cap, as described in U.S. Publication No. 2005/0075415 to Harz et al). More desirably, the total humectant and co-solvent level is less than or equal to about 10% by weight and yet more desirably less than or equal to about 8% by weight, in order to facilitate drying of the ink jet printing recording material in a high speed printer, and at least about 2% and more preferably at least about 4% by weight to encourage higher equilibrium moisture content in dried ink film on hardware for redispersion and clean-up by ink, or by start-up and shut-down fluids, or by a printhead storage fluid.

The inclusion of many functional ingredients in the inkjet ink composition can increase the fluid's viscosity. It is desirable to limit the ink dynamic viscosity in order to provide better drop formation and to reduce the fluid system pressure drop at the nozzleplate to less than about 100 psid for the convenience of fabrication and operation. It is preferred that the ink dynamic viscosity is less than about 5 mPa-s; more desirably, the ink viscosity is less than about 3 mPa-s, and still more desirable is to limit the ink viscosity to less than about 2 mPa-s. For simple marking applications requiring low ink functionality, it is most desirable to limit the ink viscosity to less than 1.5 mPa-s.

Continuous ink jet printing has needs for improved ink compositions and printing methods to satisfy market demands for high printed optical density, color fidelity, image stability, print durability to fade and abrasion, and waterfastness. High-speed continuous ink jet printing is used in commercial market applications and generally involves printing variable information for transactional documents such as invoices and credit card billing statements, and also scratch-off lottery tickets. Variable-data imprinting sub-systems, sometimes referred to as print stations, consist of a subsystems that include a printhead, control electronics, an ink reservoir, an ink pump and an ink delivery system, and they can be added to an existing high-speed press system for black text or other single color printing in labeling or mailing applications. Commonly used dye-based inks can provide adequate optical density on the normal mix of paper substrates, such as plain bond papers, surface-treated papers, or coated and calendared business gloss papers or heavy-stock covers. Dye-based inks, however, suffer poor waterfastness on all substrates, and low durability on glossy papers against wet rub abrasion that can render text and universal packaging code information illegible. Self-dispersed carbon black pigment-based ink compositions lacking a film-forming polymer binder offer high optical density on untreated bond papers that approach electrophotographic-printing quality, with visual optical density values of about 1.4. The colorant, however, is readily redispersed by wet rub abrasion, resulting in undesirably low durability and smear. Polymer-dispersed carbon black pigment ink compositions of the art offer excellent waterfastness, wet rub durability, and dry rub abrasion on all substrates, but optical density suffers on plain papers, where the colorant apparently wicks along the cellulose fibers into the interior of the paper, leading to grayish appearing printed text. Durable carbon black pigmented ink jet compositions adaptable to continuous ink jet ink formulation and printing are described in US Publication No. 2007/0043146, incorporated by reference above. A continuous ink jet printing ink composition comprised of carbon black pigment and an associated water soluble polymer resin is described in EP 0 853 106 to Thakkar et al., in U.S. Pat. No. 6,203,605 to Thakkar et al., and in U.S. Pat. No. 5,512,089 to Thakkar.

The durability, gloss, and other properties of a printed ink jet image can be improved by the application of a (preferably colorless) polymeric overcoat ink composition, as disclosed, e.g., in U.S. Pat. No. 7,219,989 B2 to Uerz et al., the disclosure of which is incorporated herein by reference in its entirety. In order to achieve the high printer speeds and throughput associated with continuous ink jet web printing, an overcoat composition can be applied using a continuous ink jet printer printhead following in line one monochrome continuous inkjet printer linehead of drop-forming nozzles, providing for a monochrome imprinter system or a monochrome printing press with improved printed image properties. Alternatively, an overcoat composition can be applied using a continuous ink jet printer printhead in line with multiple continuous inkjet printer lineheads of drop-forming nozzles, providing a multicolor ink jet imprinter system or a multicolor printing press, desirably a full color press, with improved printed image properties. The drop size, addressability, and printed resolution of the overcoat composition are not required to be the same as the printed ink jet inks, and differing continuous inkjet printhead technologies could be used, as long as the firing speed and paper transport speed requirements were met.

Replenisher fluids for use with an ink according to the invention may be comprised exclusively of water, and preferably the water is completely deionized in order to avoid the accumulation of conductive inorganic salts in the replenished ink. Desirably, the aqueous replenisher fluid contains a biocide to suppress the adventitious growth of microscopic organisms. Preferred commercial products for use in a replenisher composition include Proxel® GXL (Arch Chemicals, Inc.) and Kordek® MLX (Rohm and Haas Co.) at a final concentration of 0.0001-0.5 wt. %. The resistivity of the replenisher fluid desirably exceeds 5,000 ohm-cm, and more desirably exceeds about 200,000 ohm-cm.

The invention provides a printing system employing inkjet ink compositions which are comprised of dispersed pigment and polymer additives, such as structural polymers to improve print durability, which creates new problems in continuous inkjet ink systems employing bimodal drop size generation and recirculating ink systems, interfering with non-printing, printing and satellite formation during drop generation. The following examples, in association with FIGS. 4-7, demonstrate the effective solution to such problems wherein an in-line filter is employed selected to be effective at retaining particles having particle sizes equal to and greater than 0.6 micrometers from the liquid ink (including filters selected to be effective at retaining particles having particle sizes equal to and greater than 0.5 micrometers, and filters selected to be effective at retaining particles having particle sizes equal to and greater than 0.45 micrometers) and to pass the dispersed pigment particles.

EXAMPLES

The suffix (c) designates control or comparative ink jet ink compositions, while the suffix (e) indicates example ink jet ink compositions. The abbreviation "Wt %" indicates the ingredient weight percent. Carbon black pigment dispersion content is based on the weight percent of carbon black.

Preparation of Continuous Ink Jet Ink Samples

Polymeric Dispersant and Additive Preparation
Polymeric Dispersant PD-1

In a representative procedure, a 5-liter, three-necked round bottom flask equipped with a mechanical stirrer, a reflux condenser, and a gas inlet was charged with 225 g of 1-methoxy-2-propanol and was sparged with nitrogen. Akzo-Nobel Chemicals, Inc., initiator Perkadox AMBN-GR (1.9 g) was added with stirring. A reactant reservoir was charged with 225 g of 1-methoxy-2-propanol, 23.4 g of 1-dodecanethiol, 203.5 g of benzyl methacrylate, 165.0 g of stearyl methacrylate, and 181.5 g of methacrylic acid, and the solution was degassed by nitrogen sparging. AMBN-GR (7.7 g) was added and mixed in. The reactor temperature was raised to 77° C. and the reactants were pumped from the reservoir at a about 2.3 mL/min over a 360-min period. The reaction mixture was stirred for at least 12 h at about 77° C. The polymer was neutralized to completion with N,N-dimethylaminoethanol and stirred for 45 min. The reaction mixture was diluted with 2,580 g of water and filtered through a Pall Corp. Ultipleat polypropylene cartridge filter. The final polymer solution had a concentration of ca. 20 wt. % solids and its pH was 8.6. The average the weight average molecular weight was 9,070 daltons.

Polymeric Additive P-1

A 25-wt % aqueous dispersion of polyurethane co-polymer (weight-average molecular weight of about 25,000 daltons, with an acid number of 76 that was stoichiometrically neutralized with potassium hydroxide) comprised of particles typically ranging in size from 5-40 nm (median diameter of about 15 nm) was prepared from isophorone diisocynate and a mixture of poly(hexamethylene carbonate) diol and 2,2-bis (hydroxymethyl)proprionic acid as generally described in U.S. Patent Application No. 2009/0169748 A1.

Polymeric Additive P-2

BASF Dispersions & Pigments North America Joncryl® 586, which is a styrene acrylic type co-polymer having a weight-average molecular weight Mw of 4,300 daltons and an acid value of 110, was 100%-neutralized with N,N-dimethylaminoethanol to provide an aqueous solution containing 20 wt % solids.

Pigment Dispersion Preparation

Pigment Dispersion KD-1

To a 2.5-gallon, 9-inch diameter and 12-inch deep, double-walled stainless steel mixing vessel containing four baffles is added water (1,000 g) and a solution of Polymeric Dispersant PD-1 (1,000 g of a 19.9 wt % solution). A nominal 4-inch, ring-style disperser impeller (Hockmeyer Equipment Corp. D-Blade) driven by a Charles Ross & Son Co. Model HSM-100LH-2 High Shear Mixer is centered 2 inches above the bottom of the mixing vessel, and stirring is initiated. Orion Engineered Carbons LLC NIPex® 180 IQ carbon black pigment (500 g) is slowly integrated into the fluid. Milling media comprising beads of polystyrene resin (copolymer of styrene and divinylbenzene/ethylvinylbenzene mixture) with an average particle diameter of 50 micrometers (3,000 g) is added slowly while increasing impeller speed. The mixture is milled with an impeller blade tip speed of ca. 19 msec for about 20 h at an internal temperature of 25-35° C. Samples are periodically removed, diluted and filtered for particle size determination by a Microtrac, Inc., Nanotrac® 150 dynamic light scattering analyzer. When milling is complete, the dispersion/media milling mixture is further diluted with a solution of water (2,475 g) and Rohm and Haas Co. Kordek™ MLX preservative (25 g) to a final pigment concentration of about 10%, a polymeric dispersant concentration of about 3.9% including the counterion, and a theoretical dispersion batch size of 5000 g. The impeller is removed and the milling media filtered off. A final filtration through a 0.3-micrometer removal efficiency Pall Corp. Profile II® depth filter gave roughly 4 kg of dispersion, approximately 80% yield. The volume-weighted $50^{th}$ percentile particle size distribution diameter is about 60 nm, and the $95^{th}$ percentile particle size distribution diameter is about 105 nm as characterized by a Microtrac Inc. Nanotrac NPA 150 dynamic light scattering particle sizing instrument.

Pigment Dispersion KD-2

Carbon black pigment dispersion KD-2 is prepared in the same manner as pigment dispersion KD-1, except that Colour Black FW 285 manufactured by Orion Engineered Carbons LLC is used as the carbon black pigment. The resulting dispersion has approximately 10% pigment and 3.9% polymer dispersant, including the counterion. The volume-weighted median particle size is about 45 nm, and the $95^{th}$ percentile particle size distribution diameter is about 90 nm, as characterized by a Microtrac Inc. Nanotrac NPA 150 dynamic light scattering particle sizing instrument.

Preparation of Continuous Inkjet Ink Compositions

The abbreviation "wt %" indicates the ingredient level in percent by weight. Carbon black pigment dispersion content is based on the weight percent of carbon black.

Black Pigmented Inks

Black pigmented continuous inkjet ink compositions Ink K-A-K-F were prepared from the pigment dispersions KD-1 or KD-2 by combining the ingredients at the relative proportions that are reported in Table I. In a representative procedure, 15.0 kg of inkjet ink is prepared by adding the components individually to a 30-liter cross-linked, high density polyethylene flat bottom tank using a 2-inch impeller rotating at ca. 1,000 rpm in order to provide good mixing. The ingredients are added in the following functional component order: water, amine-acid salt solution, humectant, amine base, corrosion inhibitor, biocide, polymer solution, soluble azo dye, pigment dispersion, and surfactant. The ink composition is mixed for about 2 minutes between ingredient additions, and then it is stirred for 1 hour after the addition of the antifoamant. The ink composition is optionally pre-filtered, and then final filtered through Pall Corp. 0.2 micrometer effective pore size Ultipor® N66 cartridge filter media at a rate of about 0.5 L/min/inch of media.

In a typical analysis procedure, the solution pH and conductivity was then measured at ambient conditions using calibrated metering instruments, and electronically compensated to 25° C. Representative ion probes are the Mettler Toledo InLab® 413 pH electrode, No. 52000106, and the Corning Laboratory Conductivity Electrode, No. 476501, available in the Nova Analytics Pinnacle Series. The black pigment ink physical properties are reported in Table II.

Continuous Inkjet Printing of Ink Compositions

The ink reservoir of a continuous inkjet test stand jetting fixture was sequentially charged with each continuous inkjet ink composition, and flushing and purging for two or three cycles was carried out to ensure new ink purity. The fixture consisted of the following elements: (1) a fluid system capable of (a) pressurizing the ink in excess of 60 psid thereby producing ink volumetric flow rates of up to about 2 L/min; (b) delivering pressurized ink to a continuous inkjet printhead drop generator; (c) returning unprinted ink under vacuum to the fluid system ink reservoir; (d) detecting the ink reservoir ink concentration by electrical resistivity measurement and replenishing the ink with a replenisher fluid if concentrated by water evaporation and adding more ink to the reservoir instead when it was depleted but at the correct ink concentration; (2) a vacuum drum capable of supporting a sheet of paper and spinning it continuously at precise speeds synchronized with control unit to simulate paper web transport; (3) a continuous inkjet printhead assembly using (a) a KODAK PROSPER Press Jetting Module with effective nozzle orifice diameters of 9.6±0.2 micrometers and a MEMS silicon-based drop generator to form bimodal printing and non-printing drops of ink; (b) an air deflection zone intersecting the drop curtain provided by positive and negative air duct assemblies that direct the non-printing drops to a Coanda gutter to catch them when the printer is not printing an image file or when it is not printing a given pixel even if it is printing an image file; (c) an ink return line to the ink reservoir, and (4) a print controller that (a) controls the printing drum speed and synchronizes the drum location in accord with the data feed to the jetting module and also (b) transmits electrical signals to the jetting module CMOS circuitry that renders a raster processed image into pixel-by-pixel ink stream stimulation instructions using nozzleplate heater pulse patterns by optimized waveforms to generate non-printing catch drops and printing drops of ink delivered at the printing substrate surface pixel location as required.

The fluid system used a Micropump Inc. Micropump® series GJ-N23 DB380A gear pump to deliver the ink fluid normally through a Meissner Filtration Products Inc. capsule filter CSMK0.8-442 containing ALpHA polypropylene filter media, with a nominal effective particle removal rating of 0.8 micrometers, at about 65 psid pressure drop, which generated a uniform drop velocity of about 20 m/s/. This system filter was systematically varied to determine the effect of media composition and effective pore size on print quality (vide supra). The printhead jetting module itself was equipped with a coarser, "last chance" filter (comprised of polypropylene media with an effective particle removal rating of 1.2 micrometers according to the manufacturer) to protect the nozzleplate from plugging due to particles introduced by jetting module change-over. The fluid system gear pump speed setting was continually adjusted to provide and maintain constant fluid pressure at the jetting module to uniformly produce the desired drop velocity as per the system specification. The deflected non-printing ink drops were caught on a Coanda gutter and returned to the fluid system ink tank under vacuum. Sustained operation of the printer in non-printing, drop catch mode resulted in gradual evaporation of the aqueous ink solvent vehicle. Ink concentration was maintained to within about 5% of the original ink concentration by addition of aqueous replenisher fluid to the ink, if it became more than about 5% concentrated based on an ink electrical resistivity determination. Test targets were raster image processed to produce digital printing signal instructions for each pixel location at the appropriate transport speed of the test substrate at 600×900 pixels per inch (ppi) addressability, for speeds up to about 650 FPM, or at 600×600 ppi for speeds up to about 1,000 FPM. NewPage Sterling Ultra Gloss paper was loaded on to the constant speed, rotating drum, which was synchronized with the print data controller. Various test images were printed at different substrate transport speeds that profiled system functional printing speed capability using a 600-nozzles per inch PROSPER Press Jetting Module in a near-production print-head assembly configuration, which produced a 4.25-inch jet curtain print swath. Each printed target image was evaluated for dark defect (DD) indicating the undesired delivery of significant numbers of non-printing drops to the substrate in excess of background errors (typically <5 non-printing drops per square inch), and for pick-out defect (PO) indicating the undesired removal of a printing drop, which left an unmarked pixel on the printed image. The volumetric air flow (e.g., cubic feet per minute) across the space intersected by the jet curtain in the air deflection zone between the positive and negative duct assemblies was conveniently characterized by air pressure differentials (e.g., inches of water) using a Venturi effect measurement tube or a pitot tube. In a stepwise fashion, the air flow rate was adjusted, a print was made, and the DD and PO defect levels were assessed. The lowest air flow threshold for absence of DD formed one boundary of the operating margin, and the highest air flow without PO formed the other boundary. Certain target images were better for assessing DD and others for PO. The air flows were adjusted to provide a serviceable print window. The negative air duct was fitted with a membrane air filter holder preceding the vacuum pump to trap ink aerosols indicative of non-recombinant satellite generation.

Ink runnability was assessed over a period of days after the fluid system was charged with a new ink. A defect-free drop curtain was achieved by cross flushing, service clean cycles, and/or manual disassembly as needed. An image file was then printed continually, with the imaging ink droplets jetted into a catch pan and returned to the fluid system ink tank. The printhead was also operated in full catch, which aerated the ink excessively relative to customer operations. The ink was monitored for colorant concentration accuracy and oversized particle build-up by analytical filterability testing. Print targets to assess image quality and drop control accuracy were rendered on paper and subjected to automated scanning and image analysis. At the end of a day, the printhead was depressurized and fluid system was shut down with ink retained in the printhead (dry shutdown). At the beginning of the next working, the printhead was brought back into print-ready mode, the nozzles were cleared and a stable drop curtain established, the cycle of testing resumed. The negative air duct aerosol mist filter was also periodically examined, particularly if drop control was poor. After representative, steady state performance was achieved, the fluid system central ink tank fluid filter was changed in effective pore size and media type.

The method of system filter effective particle removal rating varied. The Meissner Filtration Products, Inc., CSMK0.8-442 ALpHA polypropylene capsule filter media was given absolute pore ratings of 0.8 micrometers based on testing with latex polymer spheres in deionized water at a flow rate of 2.0 gpm/10-inch element. Particle retention efficiencies of 100% were measured for 0.80 micrometer spheres by a liquid particle counter. Meissner Filtration Products, Inc., PROTEC CSRM0.5 capsule filter media with a rating of 0.5 micrometers, exhibited a Log Retention Value (LRV) of 5 for *Serratia marcescens* and a LRV of greater than 7 for *Saccharomyces cerevisae*. A description of representative LRV determinations can be found in the proceedings of M. R. Ltchy et al., *SPWCC Wet Process Conf.*, Feb. 13-15, 2006, Santa Clara, Calif., and in K.-V. Peinemann (Ed.) and S. P. Nunes (Ed.), "Membranes for Life Science, Vol. 1", Wiley-VCH, 2007, p. 99. Similarly, Meissner Filtration Products, Inc., EverLUX CSSMH0.6 poly(ether sulfone) capsule filter media with a rating of 0.6 micrometers was tested by the ASTM F838-05 microbial challenge using *Saccharomyces cerevisiae* at levels greater than $10^7$ cfu (colony forming units)/cm$^2$, and it exhibited a LRV of 7. Pall Corp. Ultipor N66 nylon media in capsule DFA4001NBW with a rating of 0.45 micrometers was microbially challenged typically with *Serratia marcescens* and it exhibited a LRV range of 4-6. Related nylon media in DFA4001NXP was rated at 0.45 micrometers and it showed LRV levels of greater than 7 based on testing with *Serratia marcescens*. Pall Corp. PUYZU0045 1-inch filter elements comprised of Ultipor GF-HV filter media were absolute-rated at 0.45 micrometers particle removal efficiency based on the modified OSU-F2 test developed by Oklahoma State University, as generally described in U.S. Pat. No. 5,468,382.

Black Inkjet Ink Composition Runnability

Table III illustrates the dependence of ink runnability on ink composition and fluid system filtration. In entry 1, reference ink K-A operated fully satisfactorily with the 0.8-micrometer particle removal rating filter. It consistently showed excellent drop control, without any significant number of non-printing drops reaching the test media in the 0% printing regions, and the satellite mist filter showed no evidence of captured ink aerosol (FIGS. 4a and 4b, respectively). The addition of 2.0 wt % of binder polymer to the ink K-A composition yielding the ink K-B composition resulted in runnability problems that rapidly manifested themselves and sustained themselves in entry 2. After start-up and successful restoration of the drop curtain, the diagnostic prints showed a high number of 2× non-printing drops in the white areas of the print (0% ink region), severely compromising the quality of the print, and the satellite mist filter showed significant buildup of ink residues (FIGS. 5a and 5b, respectively). After cross-flushing of the print head as part of normal preventative maintenance cleaning of the jetting module, drop control was severely impaired and the print 0% ink regions showed extraordinary densities of non-printing drops as detailed in entry 3, coupled with high levels of satellite mist capture (FIGS. 6a and 6b, respectively). The drop deflection air flow settings were accurately maintained and were within a valid print window. When the fluid system filter was changed to media with a smaller particle removal rating of 0.45 micrometers in entry 4, ink K-B could be successfully be operated indefinitely without any significant level of non-printing drops appearing in the 0% ink regions, and without satellite mist generation (FIGS. 7a and 7b, respectively). The change in system filtration allowed ink K-B to perform as stably as reference ink K-A.

Table IV shows the relationship between ink quality and drop formation quantified using a bench-top fixture using the same stimulation waveform to count the rate of coalescence of non-printing drops as a function of position in the deflection zone, which are also referred to small drop mergers. Fresh ink K-A (Entry 1) establishes a baseline for performance, with a rate of ca. 1 count/s at 1.5 mm beyond deflection zone entry. Ink K-B with added structural binder polymer shows a minor, incremental increase when fresh (Entry 2), or when subjected to closed fluid path recirculation through a 47-mm Meissner Inc. 0.8 micrometer ALpHA filter membrane using a Micropump® series GJ-N23 DB380A pump at a flow rate of 125 mL/min (Entry 3), verifying its colloidal stability to pump shear forces. In Entry 4, a sample of ink K-B removed from the ink tank of the 1-up test stand reveals almost a 10-fold increase in non-printing drop coalescence rate at 1.5 mm, despite fresh ink K-B being in conformance for colorant concentration, pH, particle size distribution as measured by a Nanotrac 150 instrument, surface tension etc. The best interpretation is that ink drying in the catch pan and in the fluid return lines is producing larger particles of dried or aggregated ink that fail to redisperse to their original size distribution. The ink particles are not removed by the 0.8 micrometer system filter, and interfere with drop formation, dramatically increasing the rate of small drop merging and also affecting satellite generation rate through the disruption of the carefully managed drop momentum transfer engineered during ligament pinch-off by the stimulation pulse height and duty cycle. When the system filter particle removal rating is reduced to 0.45 micrometers in Entry 5, the ink tank ink sample produces a 33%-lower non-printing drop coalescence rate at 1.5 mm. A sample of ink K-B collected by jetting from the printhead so that ink K-B has passed directly through the 0.45 micrometer rated system filter before collection produces a further significant reduction in small drop merger rate, as shown in Entry 6. Improved fluid system ink filtration is surprisingly able to ameliorate pigmented ink drop formation defects even though the printhead nozzles were never blocked.

Table V explores the effect of ink composition on filtration effectiveness by various media types with differing particle removal ratings. The addition of Polymer P-2 to Ink K-B yields the Ink K-C composition for further improvements in print durability. Increasing the humectant of ink K-C yields ink K-D, in an attempt to retard the ink drying responsible for ink tank oversized particle accumulation. It is observed in Table V that all ink formulations containing 2.0 wt % or higher of structural, binder polymer generate excessive numbers of printed 2× non-printing drops in 0% ink printed regions and high levels of satellite mist that would lead to hardware fouling of the negative air duct. When the particle removal rating of the system filter is reduced to 0.6 micrometers or lower from 0.8 micrometers, all inks showed significant improvement in the print-through of 2× non-printing drops on to the white spaces of the paper substrate, and at minimum, a large reduction of the satellite mist.

Pigmented Inkjet Ink Web Printing

A KODAK PROSPER 1000 Press is a commercial monochrome continuous inkjet press using PROSPER Press Jetting Modules with a MEMS silicon-based drop generator at 600 nozzles per inch orifice density that provides one-over-one perfecting with a print width of up to 24.5 inches (62.2 cm) at speeds up to 650 feet per minute (200 mpm), with image quality produced by 600×900 dpi addressability that is comparable to up to 175 lines per inch offset press quality. It is a highly productive inkjet web press making for 8, 12 and 16 page signatures with a duty cycle of 90 million A4 or US letter pages a month. One of the two fluid systems ink tank reservoirs of the above press was charged with Ink K-A, and the other with ink K-B, followed over time by inks K-E and K-F, when the study of ink K-B was complete. All pigmented inks exhibited median particles sizes of less than 0.1 micrometers (less than 100 nm), and $95^{th}$ percentile volume weighted particle size distributions of less than about 0.13 micrometers (130 nm). The total sum of humectant and organic co-solvents for each ink was less than about 10 wt %. These low loadings of humectant and organic co-solvent resulted in desirably low fluid viscosities of less than about 2.0 mPa-s that reduce the necessary fluid system pressures to produce the required drop velocity for printing (greater than about 15 m/s, and less than about 25 m/s). The air flow settings of the individual jetting modules of each of the two individual lineheads of the duplex inkjet press were adjusted to minimize DD and PO defects either during jetting module fabrication or by tuning of the linehead print assemblies themselves. The press was operated in various modes of printing at various speeds, and was cycled through evening shutdowns and morning start-ups over a period of weeks to establish a steady-state operating condition for each of the ink compositions. The press transport speed was gradually ramped from 40 FPM to 650 FPM, and printed image samples were recovered for analysis. The 6 system filters of the fluid system serving the linehead tower printing one of inks K-B, K-E, or K-F were changed over to alternative filters with smaller size particle removal rating and the press was allowed to operate over a period of days to establish a new steady state equilibrium operating condition. New test prints were made at various transport speeds from 40 FPM to 650 FPM, and printed image samples were recovered for analysis. The results are summarized in Table VI. In normal operation with 0.8 micrometer system filter particle removal rating, inks K-B, K-E, and K-F, comprised of 2 wt % or more of binder polymer in addition to polymeric dispersant, all produced non-printing, 2× drop spots on the paper web in the 0% ink white space in excess of 40 per square inch at 40 fpm transport speed, which is deemed objectionable; reference ink K-A typically produces less than about 5 under these conditions. When the system filter was replaced with a new capsule filter utilizing media with a particle removal rating of 0.45 micrometers, the non-printing drops printed through at 40 fpm in 0% ink white regions were reduced to 10 or less per square inch.

The invention has been described in detail with particular reference to certain preferred embodiments thereof, but it will be understood that variations and modifications can be effected within the scope of the invention. For example, the invention has been described for use in a continuous ink jet printer system that employs a gas flow drop deflection mechanism, thermal drop stimulation devices, and nozzle plates fabricated out of silicon. However, the invention can also be employed in continuous ink jet printer systems that use electrostatic drop deflection mechanisms, pressure modulation or vibrating body stimulation devices, and nozzles plates fabricated out of other types of materials. Electrostatic deflection can be of the type that includes separate drop charging and drop deflection electrodes or can be of the type that incorporates both functions in a single electrode.

TABLE I

Continuous Inkjet Black Pigmented Ink Compositions

| Functional Component | Ingredient | Ink K-A (Wt %) | Ink K-B (Wt %) | Ink K-C (Wt %) | Ink K-D (Wt %) | Ink K-E (Wt %) | Ink F- (Wt %) |
|---|---|---|---|---|---|---|---|
| Vehicle | Water | 45 | 37 | 32 | 29 | 35 | 36 |
| Pigment Dispersion | KD-1 | 45 | 45 | 45 | 45 | | 41 |
| | KD-2 | | | | | 41 | |
| Binder Polymer Dispersion | P-1 | | 8.0 | 8.0 | 8.0 | 7.2 | 7.2 |
| | P-2 | | | 5.0 | 5.0 | 4.5 | 4.5 |
| Soluble Dye Colorant | Direct Black 19 Solution SF (17 w/w % Direct Black 19, Sensient Colors, Inc.) | 1.2 | 1.2 | 1.2 | 1.2 | 1.1 | 1.1 |
| Humectant | Glycerine | 4.5 | 4.5 | 4.5 | 7.5 | 8.5 | 6.8 |
| Amine Salt | Salt of N-methyldiethanolamine and acetic acid (15 w/w % acetic acid) | 2.7 | 2.7 | 2.7 | 2.7 | 2.5 | 2.5 |
| Base | N-Methyldiethanolamine | 0.8 | 0.8 | 0.8 | 0.8 | 0.7 | 0.7 |
| Biocide | PROXEL ® GXL (Arch Chemicals, Inc.) | 0.1 | 0.1 | 0.1 | 0.1 | 0.1 | 0.1 |
| Nickel Metal Corrosion Inhibitor | COBRATEC ® TT-50S (PMC Specialties Group, Inc.) | 0.1 | 0.1 | 0.1 | 0.1 | 0.1 | 0.1 |
| Surfactant | SURFYNOL ® 440 (Air Products and Chemicals, Inc.) | 0.18 | 0.18 | 0.18 | 0.18 | 0.18 | 0.18 |

TABLE II

Continuous InkJet Black Pigmented Ink Properties

| Property | Ink K-A (Wt %) | Ink K-B (Wt %) | Ink K-C (Wt %) | Ink K-D (Wt %) | Ink K-E (Wt %) | Ink F- (Wt %) |
|---|---|---|---|---|---|---|
| Particle Size, $50^{th}$ % TILE (nm) | 57 | 59 | 57 | 58 | 45 | 58 |
| Particle Size, $95^{th}$ % TILE (nm) | 97 | 100 | 100 | 98 | 81 | 99 |
| pH | 8.7 | 8.8 | 8.8 | 8.8 | 8.8 | 8.9 |
| Conductivity (mS/cm) | 4.2 | 5.0 | 5.7 | 5.2 | 4.7 | 4.9 |
| Resistivity (ohm-cm) | 239 | 201 | 177 | 192 | 212 | 204 |
| Density, 25° C. (g/cm$^3$) | 1.036 | 1.040 | 1.043 | 1.049 | 1.050 | 1.044 |
| Dynamic Viscosity, 25° C. (mPa-s) | 1.40 | 1.58 | 1.79 | 1.85 | 1.89 | 1.71 |
| Static Surface Tension, 25° C. (mN/m) | 38.4 | 39.9 | 38.8 | 38.4 | 38.6 | 38.2 |
| 10-ms Dynamic Surface Tension, 25° C. (mN/m) | 47.6 | 45.4 | | | 45.6 | |

TABLE III

Effect of Ink Composition, System Operating State, and Filtration on Test Stand Drop Control

| Entry | Ink | Added Structural Polymer (wt %) | Final Test Stand System Filter | System Operating Mode | Effective Particle Size Removal Rating (micrometers) | Non-Printing Drops in 0% Patch (no./sq. in. @ 650 m/s) | Satellite Aerosol Filter OD (ISO Status V OD) |
|---|---|---|---|---|---|---|---|
| 1. (c) | K-A | 0.0 | Meissner Corp. CSMK0.8-442 ALpHA | Start-up | 0.8 | 0 | 0.08 |
| 2. (c) | K-B | 2.0 (P-1) | Meissner Corp. CSMK0.8-442 ALpHA | Start-up | 0.8 | 301 | 0.33 |

TABLE III-continued

Effect of Ink Composition, System Operating State, and Filtration on Test Stand Drop Control

| Entry | Ink | Added Structural Polymer (wt %) | Final Test Stand System Filter | System Operating Mode | Effective Particle Size Removal Rating (micrometers) | Non-Printing Drops in 0% Patch (no./sq. in. @ 650 m/s) | Satellite Aerosol Filter OD (ISO Status V OD) |
|---|---|---|---|---|---|---|---|
| 3. (c) | K-B | 2.0 (P-1) | Meissner Corp. CSMK0.8-442 ALpHA | Cross-flush | 0.8 | 1,652 | 0.73 |
| 4. (e) | K-B | 2.0 (P-1) | Pall Corp. DFA4001NXP | Start-up | 0.45 | 0 | 0.08 |

TABLE IV

Effect of Ink Composition and Treatment on Non-Printing Drop Formation Quality

| | | | | Coalesced Non-Printing Drops (count/s) | | |
|---|---|---|---|---|---|---|
| Entry | Ink | Added Structural Polymer (wt %) | Ink Source or Treatment | 1.0 mm beyond defection zone entry | 1.5 mm beyond defection zone entry | 2.0 mm beyond defection zone entry |
| 1. (c) | K-A | 0.0 | Fresh | 0.3 | 1.2 | 65 |
| 2. (c) | K-B | 2.0 (P-1) | Fresh | 0.3 | 3.0 | 128 |
| 3. (c) | K-B | 2.0 (P-1) | Closed fixture recycling with gear pump | 0.6 | 3.8 | 124 |
| 4. (c) | K-B | 2.0 (P-1) | 1-Up test stand ink tank sample (0.8 μm filtration) | 40 | 260 | 968 |
| 5. (e) | K-B | 2.0 (P-1) | 1-Up test stand ink tank sample (0.45 μm filtration) | 18 | 87 | 359 |
| 6. (e) | K-B | 2.0 (P-1) | 1-Up test stand jetted ink (0.45 μm filtration) | 12 | 49 | 289 |

TABLE V

Effect of Ink Composition and System Filtration on Test Stand Drop Control After Start-up

| Entry | Ink | Added Structural Polymer (wt %) | Final Test Stand System Filter | System Filter Media | Effective Particle Size Removal Rating (micrometers) | Typical Non-Printing Drops in 0% Patch (no./sq. in. @ 650 m/s) | Satellite Aerosol Filter Capture (Visual Appearance) |
|---|---|---|---|---|---|---|---|
| 1. (c) | K-A | 0.0 | Meissner Inc. CSMK0.8-442 ALpHA | Polypropylene | 0.8 | 1-2 | None/Low |
| 2. (c) | K-B | 2.0 (P-1) | Meissner Inc. CSMK0.8-442 ALpHA | Polypropylene | 0.8 | >100 | High |
| 3. (e) | K-B | 2.0 (P-1) | Pall Corp. PUY01NBJ | Nylon | 0.45 | <1 | None/Low |
| 4. (e) | K-B | 2.0 (P-1) | Pall Corp. PUY01ZU0045 | Glass Fiber | 0.45 | 1-2 | (None/Low) |
| 5. (c) | K-C | 3.0 (P-1, P-2) | Meissner Inc. CSMK0.8-442 ALpHA | Polypropylene | 0.8 | >100 | High |
| 6. (e) | K-C | 3.0 (P-1, P-2) | Pall Corp. DFA4001NXP | Nylon | 0.45 | 10 | None/Low |
| 7. (e) | K-C | 3.0 (P-1, P-2) | Pall Corp. PUY01ZU0045 | Glass Fiber | 0.45 | 30-40 | None/Low |
| 8. (e) | K-C | 3.0 (P-1, P-2) | Meissner Inc. PROTEC CSRF0.5 | Glass Fiber | 0.5 | 40 | None/Low |
| 9. (e) | K-C | 3.0 (P-1, P-2) | Meissner Inc. PROTEC CSRM0.5 | Glass Fiber + PVDF Membrane | 0.5 | 10 | None/Low |

TABLE V-continued

Effect of Ink Composition and System Filtration on Test Stand Drop Control After Start-up

| Entry | Ink | Added Structural Polymer (wt %) | Final Test Stand System Filter | System Filter Media | Effective Particle Size Removal Rating (micrometers) | Typical Non-Printing Drops in 0% Patch (no./sq. in. @ 650 m/s) | Satellite Aerosol Filter Capture (Visual Appearance) |
|---|---|---|---|---|---|---|---|
| 10. (c) | K-D | 3.0 (P-1, P-2) | Meissner Inc. CSMK0.8-442 ALpHA | Polypropylene | 0.8 | >100 | High |
| 11. (e) | K-D | 3.0 (P-1, P-2) | Pall Corp. PUY01NBJ | Nylon | 0.45 | <1 | None/Low |
| 12. (e) | K-D | 3.0 (P-1, P-2) | Meissner Inc. EverLUX CSSMH0.6 | PES | 0.6 | <1 | None/Low |

TABLE VI

Effect of Ink Composition and System Filtration on KODAK PROSPER Press 1000 Drop Control

| Entry | Ink | Added Structural Polymer (wt %) | Final Test Stand System Filter | System Filter Media | Effective Particle Size Removal Rating (micrometers) | Non-Printing Spots in 0% Patch (no./sq. in. @ 40 fpm) |
|---|---|---|---|---|---|---|
| 1. (c) | K-B | 2.0 (P-1) | Meissner Corp. CSMK0.8-442 ALpHA | Polypropylene | 0.8 | 44 |
| 2. (e) | K-B | 2.0 (P-1) | Pall Corp. DFA4001NBW | Nylon | 0.45 | 3 |
| 3. (c) | K-F | 2.7 (P-1, P-2) | Meissner Corp. CSMK0.8-442 ALpHA | Polypropylene | 0.8 | 100 |
| 4. (e) | K-F | 2,7 (P-1, P-2) | Pall Corp. DFA4001NBW | Nylon | 0.45 | 7 |
| 5. (c) | K-E | 2.7 (P-1, P-2) | Meissner Corp. CSMK0.8-442 ALpHA | Polypropylene | 0.8 | 250 |
| 6. (e) | K-E | 2.7 (P-1, P-2) | Pall Corp. DFA4001NBW | Nylon | 0.45 | 10 |

PARTS LIST 20 continuous printer system
22 image source
24 image processing unit
26 drop forming mechanism control circuits
28 drop forming mechanism
30 printhead
32 recording medium
34 recording medium transport system
36 recording medium transport control system
38 micro-controller
40 reservoir
42 catcher
44 recycling unit
46 pressure regulator
47 channel
48 jetting module
49 nozzle plate
50 nozzles
51 heater
52 liquid filament
54 small non-printing ink drops
56 large printing ink drops
57 trajectory
58 drop stream
60 gas flow deflection mechanism
61 positive pressure gas flow structure
62 gas flow
63 negative pressure gas flow structure
64 deflection zone
66 small drop trajectory
68 large drop trajectory
72 first gas flow duct
74 lower wall
76 upper wall
78 second gas flow duct
82 upper wall
84 seal
86 liquid return duct
88 plate
90 front face
92 positive pressure source
94 negative pressure source
96 wall
100 ink fluid coating the catcher front face
102 pick-out print defect
104 filter
θ downward angle

The invention claimed is:

1. A method of printing an image with a continuous inkjet printer system comprising:
providing a continuous inkjet printer system, the continuous inkjet printer system comprising:
a jetting module including a nozzle;
a liquid source in fluid communication with the nozzle, the liquid ink source including an in-line filter for filtering the liquid ink supplied to the nozzle;
a drop formation mechanism;
a drop deflection mechanism; and a catcher, the catcher including a liquid drop contact face;

supplying liquid ink to the jetting module at a pressure sufficient to cause liquid ink to be jetted through the nozzle using the liquid ink source;

selectively causing liquid ink drops of at least two different sizes to be formed from the liquid ink that is jetted through the nozzle using the drop forming mechanism;

deflecting liquid ink drops of one size onto the liquid drop contact face of the catcher; and allowing liquid ink drops of another size to pass by the catcher and deposit onto a print media using the drop deflection mechanism; and causing liquid drops that contact the liquid drop contact face to be recirculated to the liquid ink source for reuse;

wherein the liquid ink is an aqueous inkjet ink comprising dispersed pigment colorant particles having a mean particle size of less than 150 nanometers and at least about 0.1 wt % of polymer additive distinct from any polymer dispersant used to disperse the pigment particles, and the filter is selected to be effective at retaining particles having particle sizes equal to and greater than 0.6 micrometers from the liquid ink and to pass the dispersed pigment particles.

2. The method of printing an image of claim 1 wherein the liquid ink comprises at least about 0.5 wt % of polymer additive distinct from any polymer dispersant used to disperse the pigment particles.

3. The method of printing an image of claim 1 wherein the liquid ink comprises at least about 1 wt % of polymer additive distinct from any polymer dispersant used to disperse the pigment particles.

4. The method of printing an image of claim 1 wherein the liquid ink is comprised of less than about 10 wt % of humectant and co-solvent.

5. The method of printing an image of claim 1 wherein the liquid ink supplied to the nozzle from the liquid ink source is in-line filtered with a filter having an effective pore size rating of 0.6 micrometer or smaller, and ratio of the effective orifice diameter of the nozzle to the effective pore size rating of the filter is greater than 10.

6. The method of printing an image of claim 1, wherein the liquid ink comprises dispersed black pigment particles.

7. The inkjet method of printing an image of claim 6 wherein the black pigment particles have a median volume-weighted particle size of less than about 100 nm.

8. The method of printing an image of claim 1 wherein the liquid ink supplied to the nozzle from the liquid ink source is in-line filtered with a filter selected to be effective at retaining particles having particle sizes equal to and greater than 0.5 micrometers from the liquid ink and to pass the dispersed pigment particles.

9. The method of printing an image of claim 1 wherein the liquid ink supplied to the nozzle from the liquid ink source is in-line filtered with a filter selected to be effective at retaining particles having particle sizes equal to and greater than 0.45 micrometers from the liquid ink and to pass the dispersed pigment particles.

10. The method of printing an image of claim 1 wherein the liquid ink supplied to the nozzle from the liquid ink source is in-line filtered with a filter having an effective pore size rating of from 0.2 to 0.6 micrometer.

11. The method of printing an image of claim 1 wherein the liquid ink supplied to the nozzle from the liquid ink source is in-line filtered with a filter having an effective pore size rating of from 0.2 to 0.5 micrometer.

12. The method of printing an image of claim 1 wherein the liquid ink supplied to the nozzle from the liquid ink source is in-line filtered with a filter having an effective pore size rating of from 0.2 to 0.45 micrometer.

13. The method of printing an image of claim 1 wherein the nozzle has an effective orifice diameter of greater than or equal to 8 micrometers.

14. The method of printing an image of claim 1 wherein the nozzle has an effective orifice diameter of greater than or equal to 9 micrometers.

15. The method of printing an image of claim 1 wherein smaller liquid drops are deflected a greater distance to contact the liquid drop contact face, and larger liquid drops are deflected a smaller distance to avoid contacting the liquid drop contact face and pass by the catcher to deposit onto the print media.

16. The method of printing an image of claim 15 wherein the deflection mechanism comprises a gas flow drop deflection mechanism.

17. The method of printing an image of claim 1, wherein the polymer additive comprises water-dispersible polymer particles.

18. The method of printing an image of claim 17, wherein the polymer additive comprises a dispersed polyurethane latex polymer.

19. The method of printing an image of claim 18, wherein the dispersed polyurethane latex polymer is present at 1 wt % or greater.

20. The method of printing an image of claim 1, wherein the polymer additive comprises an acrylic polymer or copolymer.

* * * * *